(12) United States Patent
Miyake et al.

(10) Patent No.: US 9,602,691 B2
(45) Date of Patent: Mar. 21, 2017

(54) IMAGE PROCESSING APPARATUS THAT DETERMINES CODE CORRESPONDING TO A DIGITAL WATERMARK EMBEDDED IN AN IMAGE

(71) Applicant: CANON KABUSHIKI KAISHA, Tokyo (JP)

(72) Inventors: Nobutaka Miyake, Yokohama (JP); Yuki Ishida, Kawasaki (JP); Wei Song, Kawasaki (JP); Ryosuke Iguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/834,953

(22) Filed: Aug. 25, 2015

(65) Prior Publication Data

US 2016/0080603 A1 Mar. 17, 2016

(30) Foreign Application Priority Data

Sep. 12, 2014 (JP) ................................. 2014-187035

(51) Int. Cl.
*H04N 1/32* (2006.01)
*H04N 1/00* (2006.01)
*G06T 1/00* (2006.01)

(52) U.S. Cl.
CPC ......... *H04N 1/32352* (2013.01); *G06T 1/005* (2013.01); *H04N 1/00278* (2013.01);
(Continued)

(58) Field of Classification Search
None
See application file for complete search history.

(56) References Cited

U.S. PATENT DOCUMENTS 4,918,541 A 4/1990 Ishida et al.
5,060,280 A 10/1991 Mita et al.
(Continued)

FOREIGN PATENT DOCUMENTS

JP 2003-348327 A 12/2003

OTHER PUBLICATIONS

U.S. Appl. No. 14/835,863, dated Aug. 26, 2015.
U.S. Appl. No. 14/837,505, dated Aug. 27, 2015.
U.S. Appl. No. 14/844,211, dated Sep. 3, 2015.

*Primary Examiner* — Paul F Payer
(74) *Attorney, Agent, or Firm* — Fitzpatrick, Cella, Harper & Scinto

(57) ABSTRACT

Upon capturing a digital watermark-embedded print product by an image capturing device held by the hand of a user and extracting embedded information, the relative speed between the hand-held image capturing device and the print product changes, failing in extracting the embedded additional information. In an embodiment, the image capturing device performs continuous shooting for every small area to read the print product. A shoot image is analyzed to calculate the feature amount of the image. Information about an image capturing quality characteristic generated at the time of capturing the print product is estimated, and a change of the feature amount accompanying the image capturing quality characteristic is predicted based on the estimation result. A code indicated by the watermark is determined based on the calculation result and the prediction result.

29 Claims, 14 Drawing Sheets

(52) U.S. Cl.
CPC ..... *H04N 1/00307* (2013.01); *H04N 1/00827* (2013.01); *G06T 2201/0051* (2013.01); *G06T 2201/0065* (2013.01); *H04N 2201/0081* (2013.01); *H04N 2201/327* (2013.01); *H04N 2201/3271* (2013.01)

(56) References Cited

U.S. PATENT DOCUMENTS

| | | | |
|---|---|---|---|
| 5,493,415 | A | 2/1996 | Mita et al. |
| 5,680,486 | A | 10/1997 | Mita et al. |
| 5,714,985 | A | 2/1998 | Kawamura et al. |
| 5,848,185 | A | 12/1998 | Koga et al. |
| 5,905,579 | A | 5/1999 | Katayama et al. |
| 6,009,213 | A | 12/1999 | Miyake |
| 6,556,711 | B2 | 4/2003 | Koga et al. |
| 6,661,838 | B2 | 12/2003 | Koga et al. |
| 7,006,668 | B2 | 2/2006 | Iguchi et al. |
| 7,103,214 | B2 | 9/2006 | Kusakabe et al. |
| 7,167,205 | B2 | 1/2007 | Akiyama et al. |
| 7,177,463 | B2 | 2/2007 | Kusakabe et al. |
| 7,408,680 | B2 * | 8/2008 | Miyake ................. G06T 1/0028 358/3.01 |
| 7,433,538 | B2 | 10/2008 | Kusakabe et al. |
| 7,634,153 | B2 * | 12/2009 | Miyake ................. G06T 5/002 348/606 |
| 7,738,030 | B2 | 6/2010 | Akiyama et al. |
| 8,023,764 | B2 | 9/2011 | Miyake et al. |
| 8,306,357 | B2 | 11/2012 | Miyake et al. |
| 8,600,154 | B2 | 12/2013 | Umeda et al. |
| 8,675,249 | B2 | 3/2014 | Umeda et al. |
| 8,744,209 | B2 | 6/2014 | Miyake et al. |
| 8,929,681 | B2 | 1/2015 | Umeda et al. |
| 9,036,205 | B2 | 5/2015 | Umeda et al. |
| 9,088,753 | B2 | 7/2015 | Akiba et al. |
| 9,313,360 | B2 * | 4/2016 | Morovic ............ H04N 1/32309 |
| 9,386,235 | B2 * | 7/2016 | Ma ........................ H04N 5/265 |
| 2004/0046896 | A1 | 3/2004 | Koga et al. |

\* cited by examiner

FIG. 5
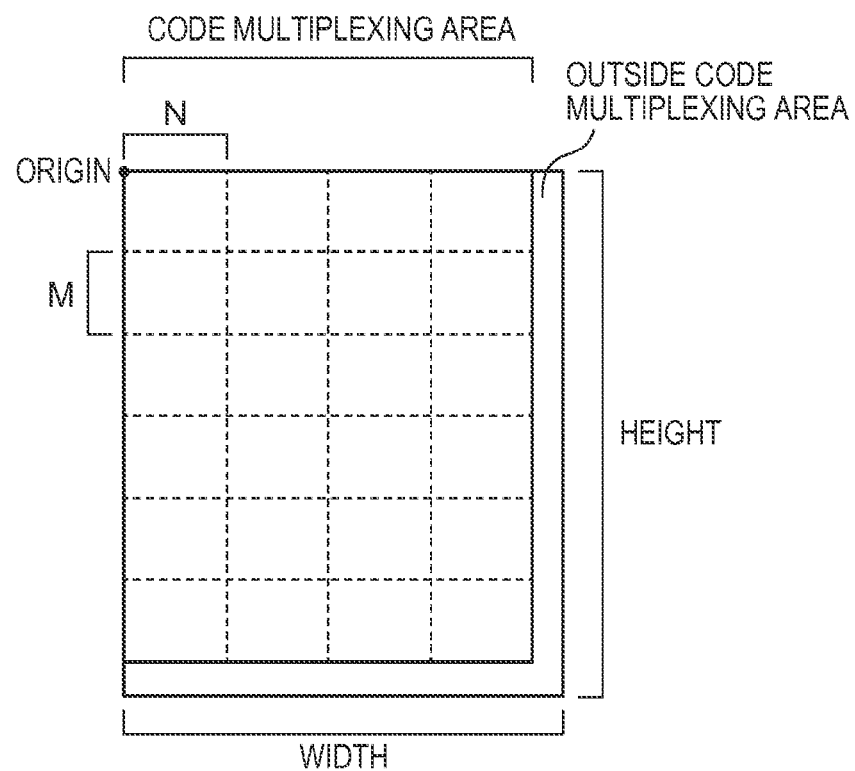
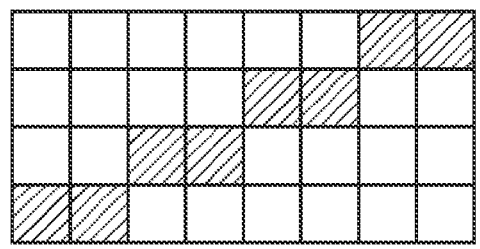
FIG. 6A
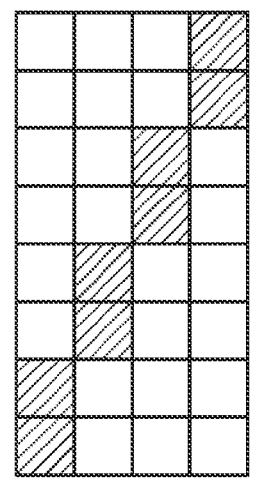
FIG. 6B

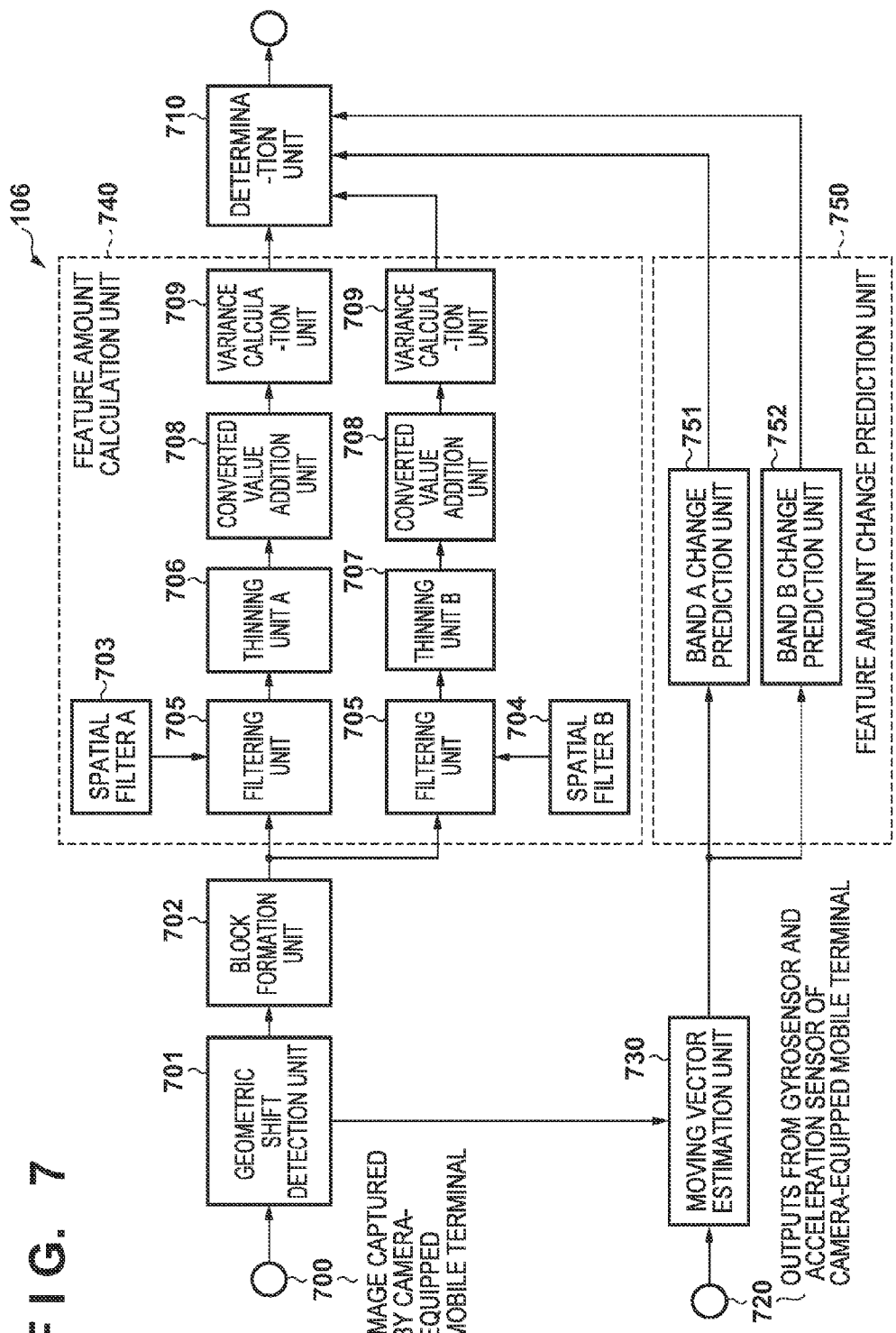

FIG. 8
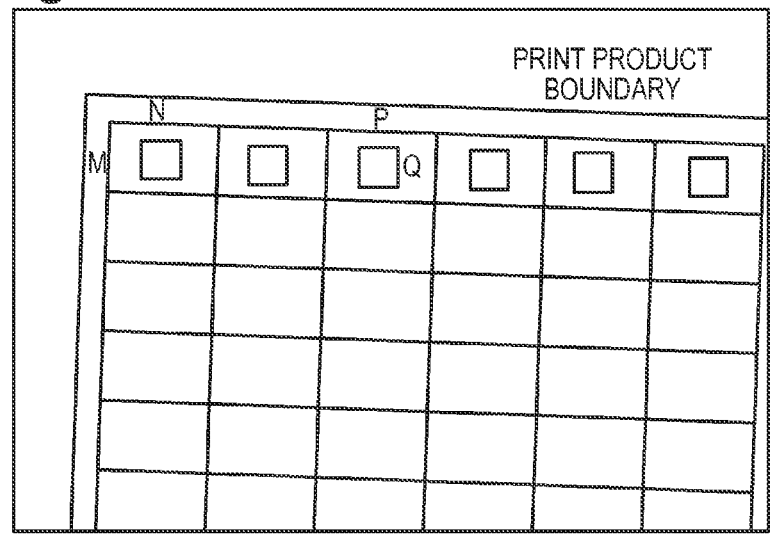
FIG. 9A  FIG. 9B
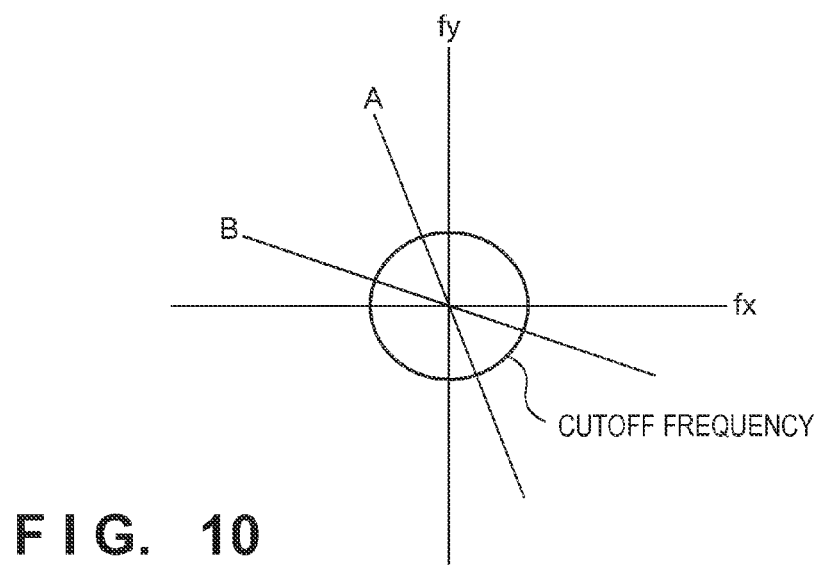
FIG. 10

FIG. 12

| 3 | 3 | 2 | 2 | 1 | 1 | 0 | 0 | 3 | 3 | 2 | 2 | 1 | 1 | 0 | 0 |
|---|---|---|---|---|---|---|---|---|---|---|---|---|---|---|---|
| 2 | 2 | 1 | 1 | 0 | 0 | 3 | 3 | 2 | 2 | 1 | 1 | 0 | 0 | 3 | 3 |
| 1 | 1 | 0 | 0 | 3 | 3 | 2 | 2 | 1 | 1 | 0 | 0 | 3 | 3 | 2 | 2 |
| 0 | 0 | 3 | 3 | 2 | 2 | 1 | 1 | 0 | 0 | 3 | 3 | 2 | 2 | 1 | 1 |
| 3 | 3 | 2 | 2 | 1 | 1 | 0 | 0 | 3 | 3 | 2 | 2 | 1 | 1 | 0 | 0 |
| 2 | 2 | 1 | 1 | 0 | 0 | 3 | 3 | 2 | 2 | 1 | 1 | 0 | 0 | 3 | 3 |
| 1 | 1 | 0 | 0 | 3 | 3 | 2 | 2 | 1 | 1 | 0 | 0 | 3 | 3 | 2 | 2 |
| 0 | 0 | 3 | 3 | 2 | 2 | 1 | 1 | 0 | 0 | 3 | 3 | 2 | 2 | 1 | 1 |
| 3 | 3 | 2 | 2 | 1 | 1 | 0 | 0 | 3 | 3 | 2 | 2 | 1 | 1 | 0 | 0 |
| 2 | 2 | 1 | 1 | 0 | 0 | 3 | 3 | 2 | 2 | 1 | 1 | 0 | 0 | 3 | 3 |
| 1 | 1 | 0 | 0 | 3 | 3 | 2 | 2 | 1 | 1 | 0 | 0 | 3 | 3 | 2 | 2 |
| 0 | 0 | 3 | 3 | 2 | 2 | 1 | 1 | 0 | 0 | 3 | 3 | 2 | 2 | 1 | 1 |
| 3 | 3 | 2 | 2 | 1 | 1 | 0 | 0 | 3 | 3 | 2 | 2 | 1 | 1 | 0 | 0 |
| 2 | 2 | 1 | 1 | 0 | 0 | 3 | 3 | 2 | 2 | 1 | 1 | 0 | 0 | 3 | 3 |
| 1 | 1 | 0 | 0 | 3 | 3 | 2 | 2 | 1 | 1 | 0 | 0 | 3 | 3 | 2 | 2 |
| 0 | 0 | 3 | 3 | 2 | 2 | 1 | 1 | 0 | 0 | 3 | 3 | 2 | 2 | 1 | 1 |

FIG. 13

| 3 | 2 | 1 | 0 | 3 | 2 | 1 | 0 | 3 | 2 | 1 | 0 | 3 | 2 | 1 | 0 |
|---|---|---|---|---|---|---|---|---|---|---|---|---|---|---|---|
| 3 | 2 | 1 | 0 | 3 | 2 | 1 | 0 | 3 | 2 | 1 | 0 | 3 | 2 | 1 | 0 |
| 2 | 1 | 0 | 3 | 2 | 1 | 0 | 3 | 2 | 1 | 0 | 3 | 2 | 1 | 0 | 3 |
| 2 | 1 | 0 | 3 | 2 | 1 | 0 | 3 | 2 | 1 | 0 | 3 | 2 | 1 | 0 | 3 |
| 1 | 0 | 3 | 2 | 0 | 0 | 3 | 2 | 1 | 0 | 3 | 2 | 1 | 0 | 3 | 2 |
| 1 | 0 | 3 | 2 | 0 | 0 | 3 | 2 | 1 | 0 | 3 | 2 | 1 | 0 | 3 | 2 |
| 0 | 3 | 2 | 1 | 0 | 3 | 2 | 1 | 0 | 3 | 2 | 1 | 0 | 3 | 2 | 1 |
| 0 | 3 | 2 | 1 | 0 | 3 | 2 | 1 | 0 | 3 | 2 | 1 | 0 | 3 | 2 | 1 |
| 3 | 2 | 1 | 0 | 3 | 2 | 1 | 0 | 3 | 2 | 1 | 0 | 3 | 2 | 1 | 0 |
| 3 | 2 | 1 | 0 | 3 | 2 | 1 | 0 | 3 | 2 | 1 | 0 | 3 | 2 | 1 | 0 |
| 2 | 1 | 0 | 3 | 2 | 1 | 0 | 3 | 2 | 1 | 0 | 3 | 2 | 1 | 0 | 3 |
| 2 | 1 | 0 | 3 | 2 | 1 | 0 | 3 | 2 | 1 | 0 | 3 | 2 | 1 | 0 | 3 |
| 1 | 0 | 3 | 2 | 0 | 0 | 3 | 2 | 1 | 0 | 3 | 2 | 1 | 0 | 3 | 2 |
| 1 | 0 | 3 | 2 | 0 | 0 | 3 | 2 | 1 | 0 | 3 | 2 | 1 | 0 | 3 | 2 |
| 0 | 3 | 2 | 1 | 0 | 3 | 2 | 1 | 0 | 3 | 2 | 1 | 0 | 3 | 2 | 1 |
| 0 | 3 | 2 | 1 | 0 | 3 | 2 | 1 | 0 | 3 | 2 | 1 | 0 | 3 | 2 | 1 |

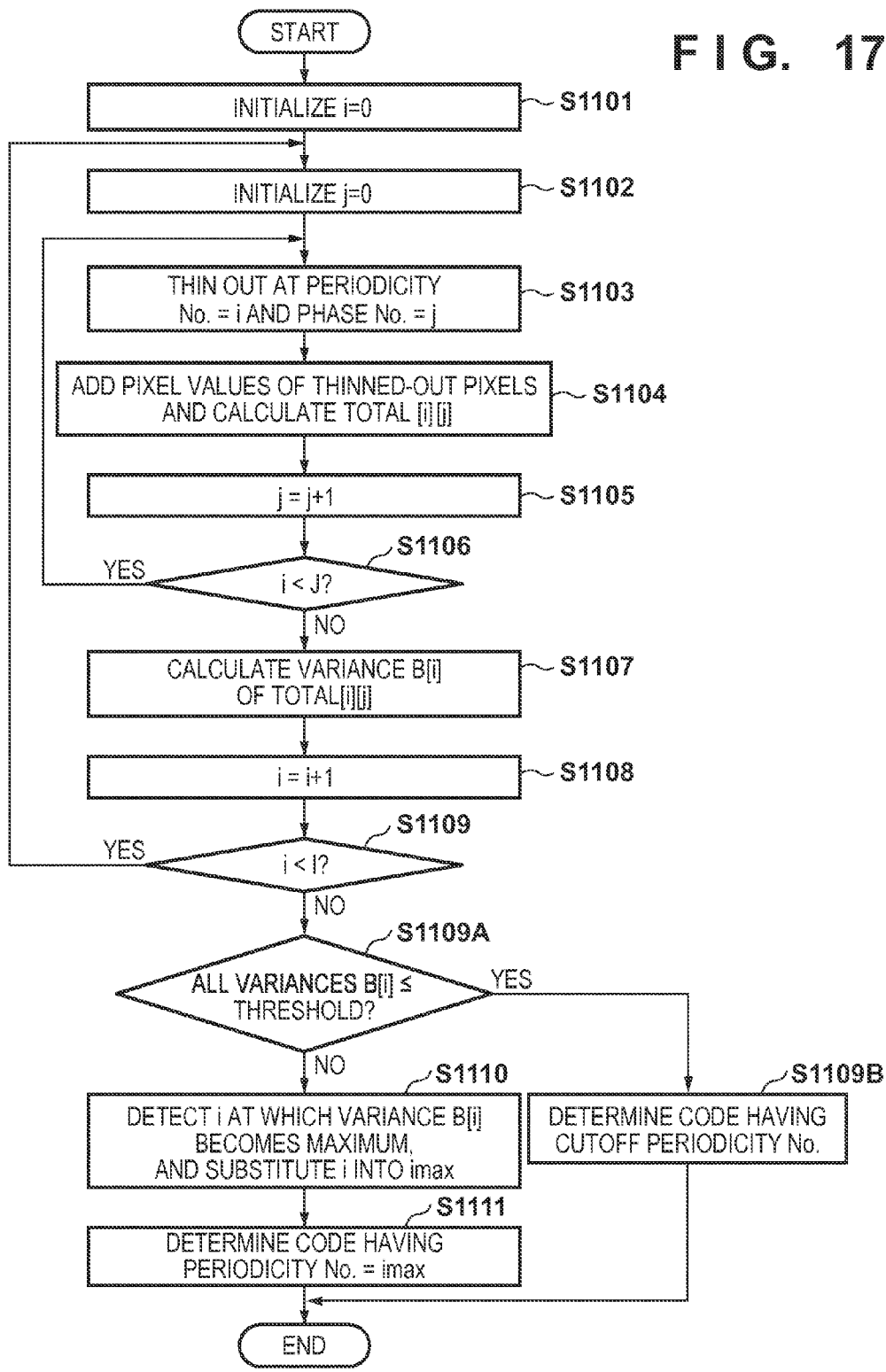

FIG. 19A
FIG. 19B
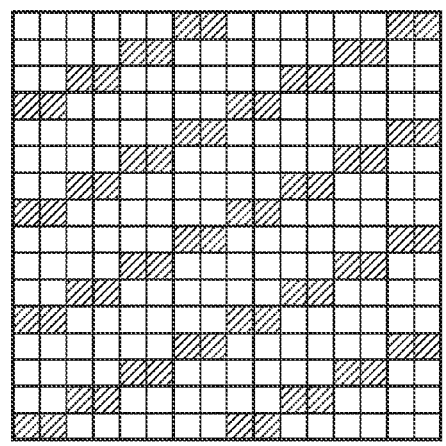
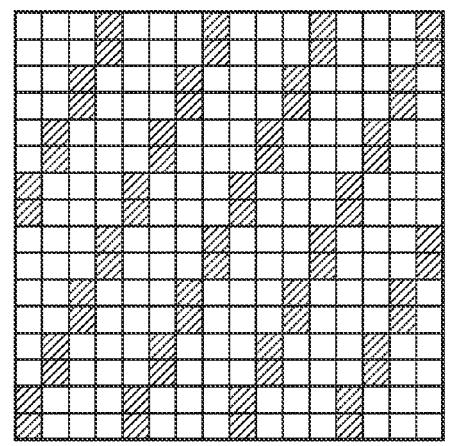
FIG. 20
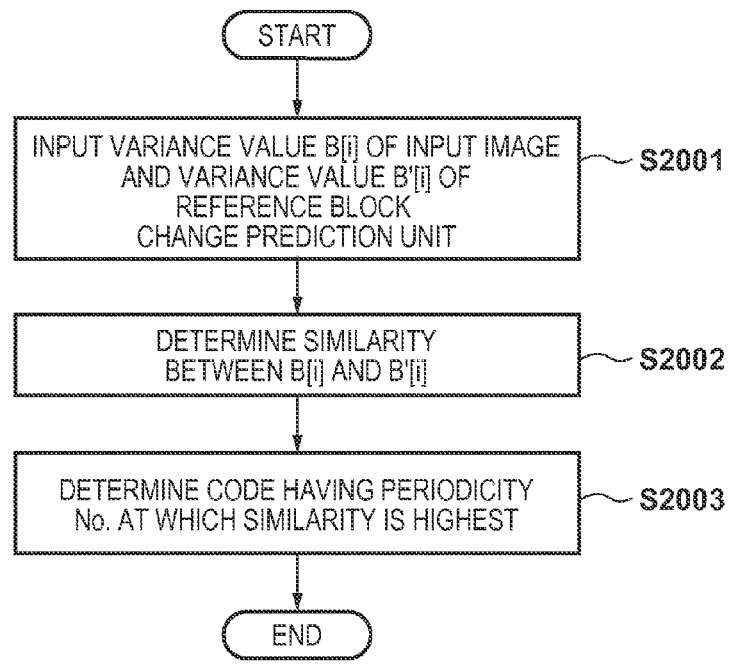

IMAGE PROCESSING APPARATUS THAT DETERMINES CODE CORRESPONDING TO A DIGITAL WATERMARK EMBEDDED IN AN IMAGE

BACKGROUND OF THE INVENTION

Field of the Invention

The present invention relates to an image processing apparatus, image processing method, and storage medium, and particularly to a technique of reading out and processing additional information from a print product in which information other than image information, for example, voice information, text information, and pieces of information about an image are embedded as additional information in the image.

Description of the Related Art

There has been proposed a technique of embedding information in a print product so that the information does not stand out (to be referred to as "invisible" hereinafter). This technique is called a digital watermark or steganography and has been developed rapidly in recent years.

Japanese Patent Laid-Open No. 2003-348327 discloses a method of embedding multiplexed information other than visible image information in a print product, and a method of extracting multiplexed additional information in the print product from information input by using a scanner (image scanner).

However, the following problem arises in Japanese Patent Laid-Open No. 2003-348327.

It is very difficult to perform shooting accurately a plurality of times while holding a camera-equipped mobile phone or smartphone by the hand and shifting the shooting position. To easily perform shooting by the user, it is desirable to execute a setting (continuous shooting mode) of automatically releasing the shutter in every predetermined time while moving the camera by the hand, or execute a moving image shooting mode. In this case, however, a captured image may blur under the influence of the relative speeds of movement of the hand-held camera and a stationary print product, failing in extracting embedded additional information.

SUMMARY OF THE INVENTION

Accordingly, the present invention is conceived as a response to the above-described disadvantages of the conventional art.

For example, an image processing apparatus, image processing method, and storage medium according to this invention are capable of accurately reading a digital watermark embedded in a print product even when a user captures the print product while holding an image capturing device such as a camera by the hand and moving it.

According to one aspect of the present invention, there is provided an image processing apparatus comprising: an input unit configured to input an image obtained by capturing, by an image capturing device, a print product in which a digital watermark is embedded; an obtaining unit configured to obtain information about a moving direction of the image capturing device with respect to the print product in image capturing of the print product; and a determination unit configured to, based on the information obtained by the obtaining unit and frequency characteristics in a partial area of the image input by the input unit determine a code corresponding to the digital watermark embedded in the partial area.

The invention is particularly advantageous since, even if a blur occurs in an image obtained by capturing a print product while moving an image capturing device such as a camera held by the hand of a user, a digital watermark embedded in the print product can be read accurately.

Further features of the present invention will become apparent from the following description of exemplary embodiments (with reference to the attached drawings).

BRIEF DESCRIPTION OF THE DRAWINGS

FIG. 5 is a view showing one image in which the horizontal pixel count is WIDTH and the vertical pixel count is HEIGHT.

FIGS. 6A and 6B are views showing an example of quantization conditions A and B.

FIG. 7 is a block diagram showing the arrangement of an additional information demultiplexing unit 106.

FIG. 8 is a view showing the relationship with a print product included in a captured image.

FIGS. 9A and 9B are views showing examples of a spatial filter used in an additional information demultiplexing unit.

FIG. 10 is a view showing an outline of processing in a two-dimensional frequency region according to the first embodiment.

FIGS. 12 and 13 are views showing in the table format a thinning method in a case where the block size is P=Q=16.

FIG. 17 is a flowchart showing the operation procedures of thinning units, addition units, and a determination unit in a state divergent from an ideal state.

FIGS. 19A and 19B are views showing examples of a reference block; and

FIG. 20 is a flowchart showing processing of determining a code based on variance values output from two feature amount calculation units.

DESCRIPTION OF THE EMBODIMENTS

Exemplary embodiments of the present invention will now be described in detail in accordance with the accompanying drawings. However, the relative arrangement of components and the like set forth in the embodiments do not intend to limit the scope of the invention to them, unless otherwise specified.

In this specification, the terms "print" and "printing" not only include the formation of significant information such as characters and graphics, but also broadly include the formation of images, figures, patterns, and the like on a print medium, or the processing of the medium, regardless of whether they are significant or insignificant and whether they are so visualized as to be visually perceivable by humans.

Also, the term "print medium" not only includes a paper sheet used in common printing apparatuses, but also broadly includes materials, such as cloth, a plastic film, a metal plate, glass, ceramics, wood, and leather, capable of accepting ink.

An image processing apparatus according to each of the embodiments to be described below includes an additional information multiplexing unit that embeds additional information in a print product, and an additional information demultiplexing unit that reads the additional information from the print product. It is efficient to implement the additional information multiplexing unit as printer driver software or application software in a computer that generates image information to be output to a printer engine. However, it is also effective to integrate the additional information multiplexing unit as hardware and software in a copying machine, facsimile apparatus, printer main body, or the like. In contrast, the additional information demultiplexing unit is implemented in a camera-equipped mobile phone, camera-equipped smartphone, tablet PC, or the like. A device having an image capturing function will be called a camera-equipped mobile terminal. The additional information demultiplexing unit may be, for example, a series of units that separate additional information by application software in a computer from an image captured by a digital still camera.

First Embodiment

Figure 1:
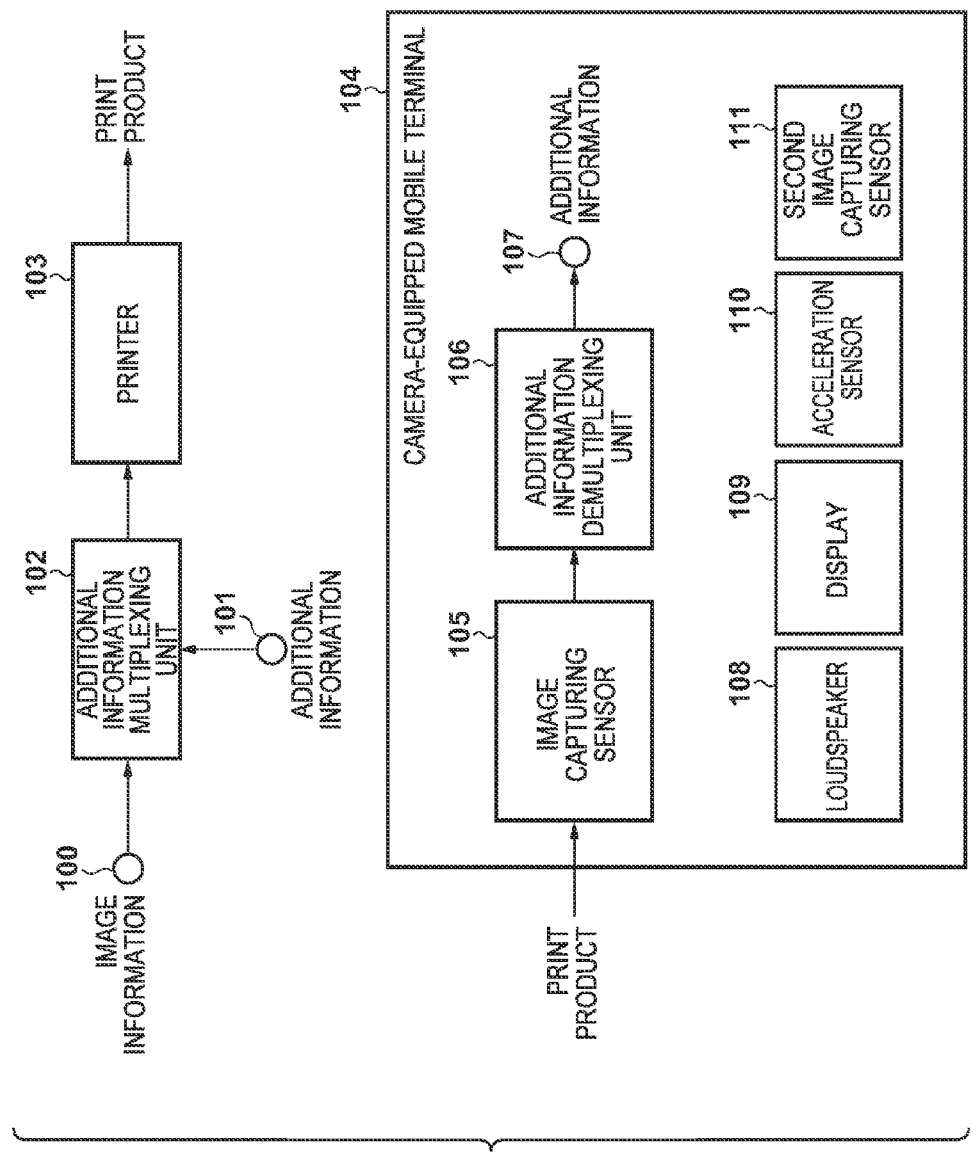
FIG. 1 is a block diagram showing the arrangement of an image processing system according to an embodiment of the present invention.

FIG. 1 is a block diagram showing the arrangement of an image processing system according to the first embodiment of the present invention. In FIG. 1, multi-valued image information is input from an input terminal 100, and necessary additional information to be embedded in the image information is input from an input terminal 101. The additional information is considered to be information other than the image information input from the input terminal 100, for example, voice information, moving image information, text information, pieces of information such as the copyright, shooting date & time, shooting location, and user regarding an image input from the input terminal 100, and another image information.

An additional information multiplexing unit 102 embeds additional information in image information so as for human eyes to be difficult to visually discriminate the additional information. The additional information multiplexing unit 102 executes even quantization processing of input multi-valued image information, together with multiplexing of additional information. A printer 103 receives information generated by the additional information multiplexing unit 102, and outputs an additional information-multiplexed image from an internal printer engine. The printer 103 can use a printer engine employing an inkjet method, a printer engine employing an electrophotographic method, or the like. Regardless of the printer engine used, the printer 103 implements a halftoning representation by pseudo-halftoning.

An image capturing sensor 105 of a camera-equipped mobile terminal 104 reads information on a print product output from the printer 103. An additional information demultiplexing unit 106 separates the additional information embedded in the print product and outputs it from an output terminal 107. The output terminal 107 is an interface that outputs obtained additional information. The output terminal 107 outputs additional information to a loudspeaker 108 of the camera-equipped mobile terminal 104 in a case where the additional information is voice information, and outputs it to a display 109 in a case where the additional information is image information. The interface may be an interface that outputs data to an external device. In a case where the camera-equipped mobile terminal 104 includes a plurality of image capturing sensors, a second image capturing sensor 111 may capture a print product.

Figure 2:
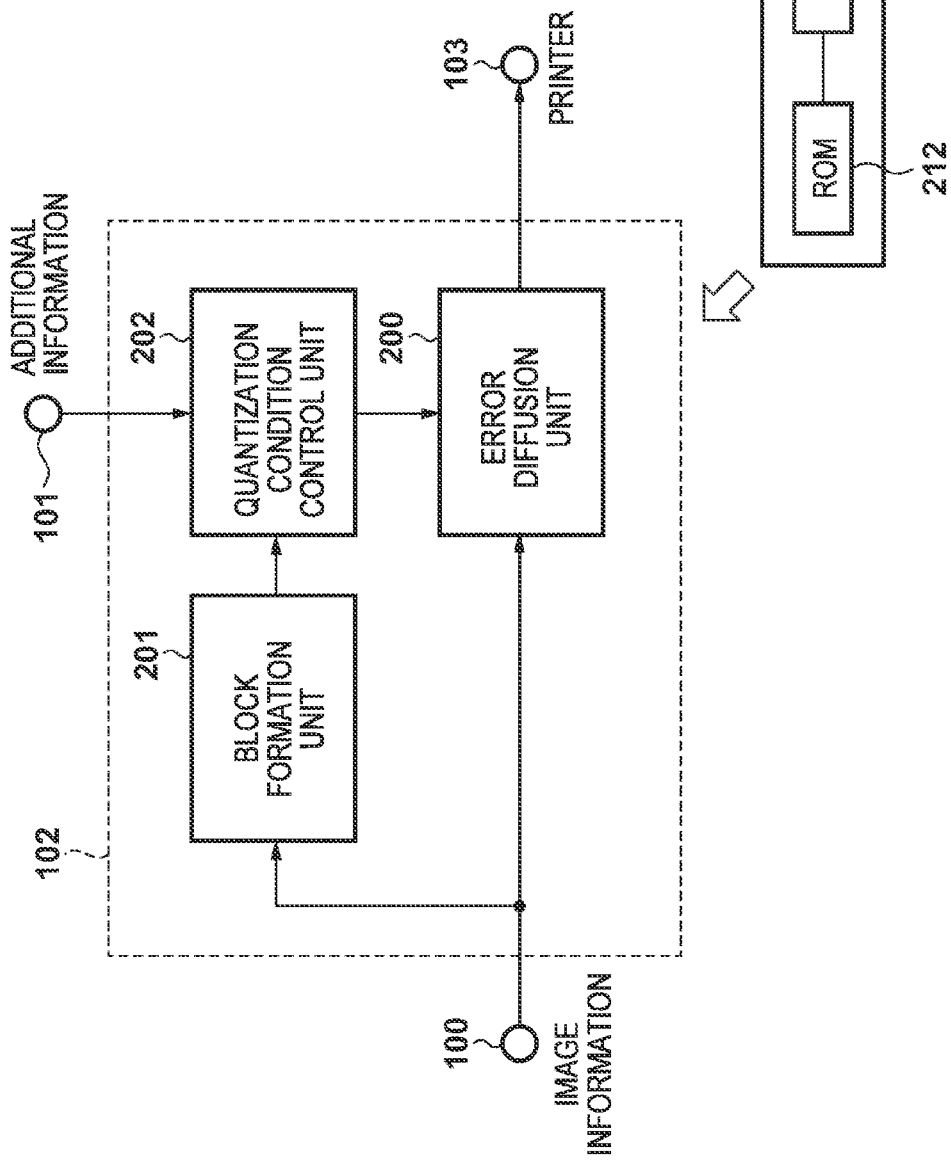
FIG. 2 is a block diagram showing the detailed arrangement of an additional information multiplexing unit 102 shown in FIG. 1.

FIG. 2 is a block diagram showing the detailed arrangement of the additional information multiplexing unit 102 shown in FIG. 1.

An error diffusion unit 200 of the additional information multiplexing unit 102 performs pseudo-halftoning using an error diffusion method to convert image information input from the input terminal 100 into a quantization level lower than the number of input gradation, thereby representing the gradation is based on the quantized values of a plurality of pixels. Details of error diffusion processing will be described later.

A block formation unit 201 segments input image information in a predetermined area unit. Block formation performed by the block formation unit 201 may be segmentation into rectangles or areas other than rectangles. A quantization condition control unit 202 changes and controls a quantization condition in the area unit of the block formed by the block formation unit 201. The quantization condition control unit 202 controls the quantization condition for each block based on additional information input from the input terminal 101.

A control unit 210 includes a CPU 211, a ROM 212, and a RAM 213. The CPU 211 controls the operations and processes of the above-described components in accordance with control programs held in the ROM 212. The RAM 213 is used as the working area of the CPU 211.

Figure 3:
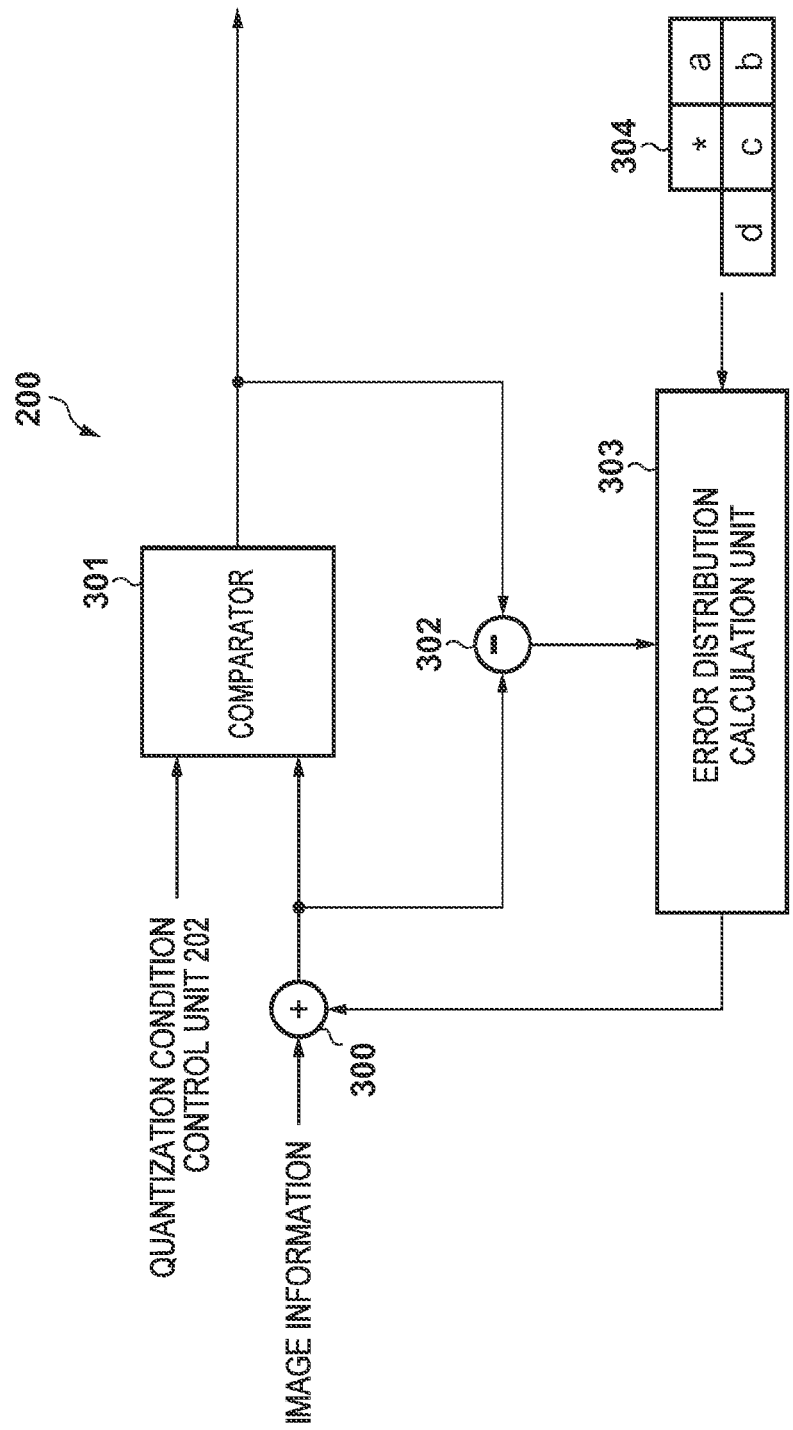
FIG. 3 is a block diagram showing details of an error diffusion unit 200.

FIG. 3 is a block diagram showing details of the error diffusion unit 200. Note that error diffusion processing is well known and a description thereof will be omitted.

Error diffusion processing in which the quantized value is binary will be exemplified.

An adder 300 adds the value of a pixel of interest of input image information and the distributed quantization error of a binarized adjacent pixel. A comparator 301 compares a quantization threshold from the quantization condition control unit 202 with an addition result of adding an error. The comparator 301 outputs "1" in a case where the addition result is larger than a predetermined threshold; otherwise, "0". For example, upon representing the pixel gradation at 8-bit accuracy, it is generally represented by a maximum value "255" and a minimum value "0".

Assume that a dot (for example, ink or toner) is printed on a print medium in a case where the quantized value is "1". A subtracter 302 calculates an error between the quantization result and the above-mentioned addition result, and distributes, based on an error distribution calculation unit 303, the error to adjacent pixels to undergo subsequent quantization processing.

A distribution table (error diffusion matrix) 304 of errors experimentally set based on a relative distance to a pixel of interest is prepared in advances for the error distribution ratio. An error is distributed based on a distribution ratio set in the distribution table 304. The distribution table 304 shown in FIG. 3 is a distribution table for four adjacent pixels, but is not limited to this.

Next, the operation procedures of entire error diffusion processing including the quantization condition control unit 202 will be explained with reference to a flowchart.

Figure 4:
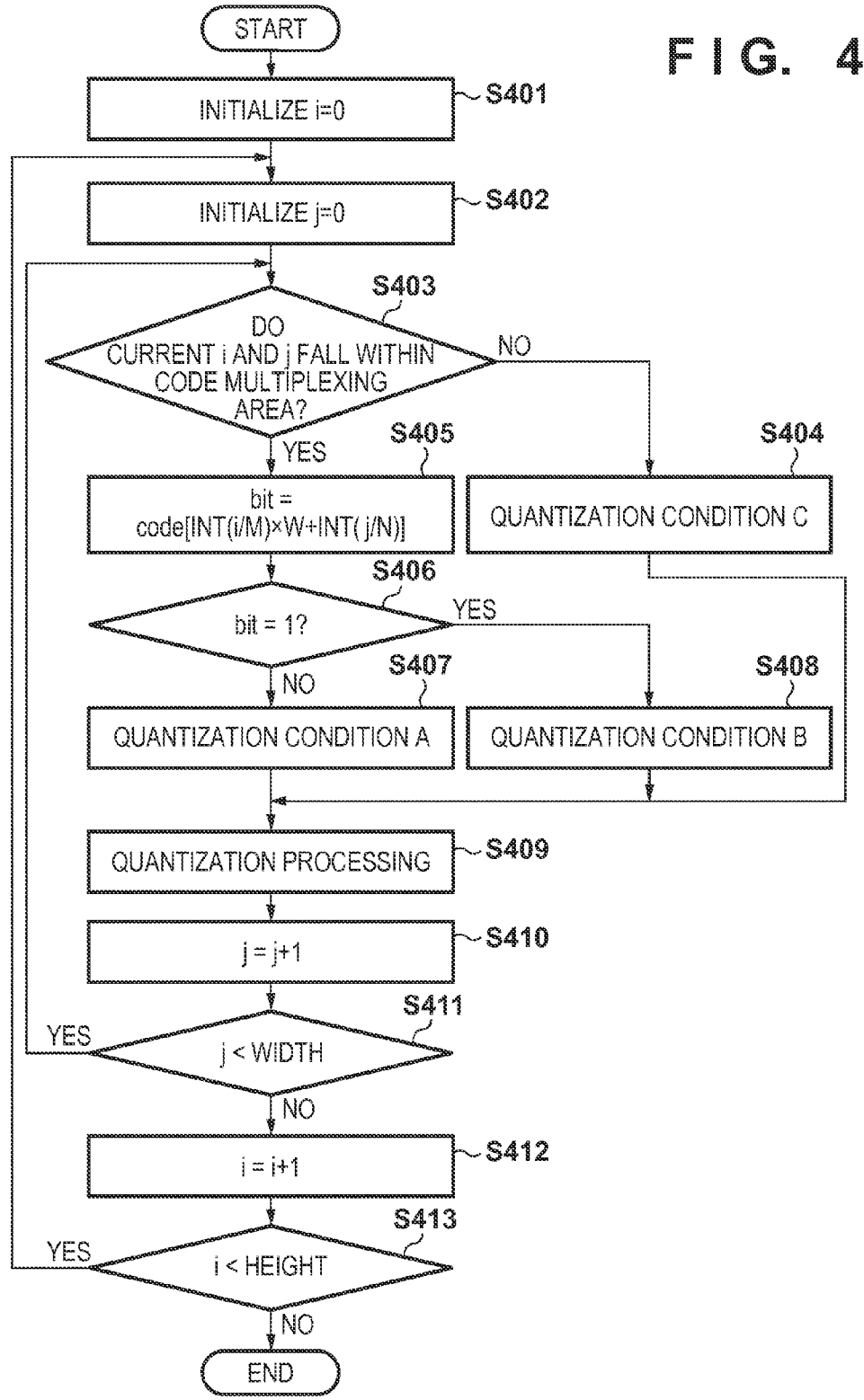
FIG. 4 is a flowchart showing an outline of entire error diffusion processing.

FIG. 4 is a flowchart showing an outline of the entire error diffusion processing. An example in which the quantized value is binary will be explained.

In step S401, a variable i is initialized to "0". The variable i is a variable for counting an address in the vertical direction. In step S402, a variable j is initialized to "0". The variable j is a variable for counting an address in the horizontal direction. In step S403, it is determined whether a coordinate point indicated by the variables (i, j) serving as the current processing address belongs to an area for which multiplexing processing should be executed.

The multiplexing area will be explained with reference to the drawing.

FIG. 5 is a view showing one image in which the horizontal pixel count is WIDTH and the vertical pixel count is HEIGHT. Assume that additional information is multiplexed on this image.

The upper left corner of the image shown in FIG. 5 is defined as an origin, and the image undergoes block formation to form rectangles each of N pixels in the lateral direction×M pixels in the longitudinal direction. Although block formation is performed using the origin as a reference point in this embodiment, a point spaced apart from the origin may be set as a reference point. Upon multiplexing maximum information in this image, blocks each of N×M pixels are arranged from the reference point. More specifically, letting W be the number of blocks that can be arranged in the horizontal direction, and H be the number of blocks that can be arranged in the vertical direction, the following relations are obtained:

$$W=\text{INT}(\text{WIDTH}/N) \quad (1)$$

$$H=\text{INT}(\text{HEIGHT}/M) \quad (2)$$

where the value of INT ( ) is an integer.

The remainder numbers of pixels indivisible in equation (1) and equation (2) are equivalent to an end portion in a case where a plurality of blocks each of N×M pixels are arranged. This end portion serves as the outside of the code multiplexing area.

Referring back to FIG. 4, if it is determined in step S403 that the currently processed pixel of interest falls outside the multiplexing area, the process advances to step S404 to set a quantization condition C. In contrast, if it is determined that the pixel of interest falls within the multiplexing area, the process advances to step S405 to read additional information to be multiplexed. For descriptive convenience, assume that additional information is represented bit by bit using an array code [ ]. For example, assuming that additional information is 48-bit information, the array code [ ] stores respective bits in code [0] to code [47].

In step S405, information in the array code [ ] is substituted into a variable bit:

$$\text{bit}=\text{code}[\text{INT}(i/M) \times W+\text{INT}(j/N)] \quad (3)$$

Subsequently, in step S406, it is determined whether the value of the substituted variable bit is "1". As described above, information in the array code [ ] is stored bit by bit, so the value of the variable bit also indicates either "0" or "1". If it is determined in step S406 that the value of the variable bit is "0", the process advances to step S407 to set a quantization condition A. If it is determined that the value of the variable bit is "1", the process advances to step S408 to set a quantization condition B.

In step S409, quantization processing is executed based on the set quantization condition. This quantization processing is quantization processing based on the error diffusion method described with reference to FIG. 3. In step S410, the variable j in the horizontal direction is incremented by one. In step S411, it is determined whether the value of the variable j is smaller than the horizontal pixel count WIDTH of the image. The above-described processing is repeated until the processed pixel count reaches WIDTH. If it is determined that j≥WIDTH and the processing in the horizontal direction has ended for the pixel count WIDTH, the process advances to step S412 to increment the variable i in the vertical direction by one.

In step S413, it is determined whether the value of the variable i is smaller than the vertical pixel count HEIGHT of the image. The above-described processing is repeated until the processed pixel count reaches HEIGHT. If it is determined that i≥HEIGHT, the process ends.

By the above-described processing, the quantization condition can be changed for each block formed from N×M pixels.

Next, an example of the quantization conditions A, B, and C will be explained.

Although the quantization condition in the error diffusion method has various factors, the quantization condition is a quantization threshold in the first embodiment. Since the quantization condition C is used outside the multiplexing area, the quantization threshold is arbitrary. As described above, in a case where the quantization level is binary in a gradation representation of 8 bits per pixel, the maximum value "255" and the minimum value "0" are quantization representative values, and an intermediate value "128" is often set as the quantization threshold. That is, the quantization condition C is a condition that the quantization threshold is fixed to "128".

Since the quantization conditions A and B are used in blocks within the multiplexing area, the difference in image quality needs to be generated in accordance with the difference between the quantization conditions. However, it is necessary that the difference in image quality needs to be represented so that it is difficult to visually discriminate the difference, but the difference has to be easily identified on a print medium.

FIGS. 6A and 6B are views showing an example of the quantization conditions A and B.

FIG. 6A is a view showing the period of a change of the quantization threshold in the quantization condition A. In FIG. 6A, one square indicates one pixel, a white square indicates a fixed threshold, and a shaded square indicates a variable threshold. That is, in the example shown in FIG. 6A, a matrix of eight pixels in the lateral direction and four pixels in the longitudinal direction is constituted, and an excessive value is set as a threshold only for a shaded square.

To the contrary, FIG. 6B is a view showing the period of a change of the quantization threshold in the quantization condition B. In the example shown in FIG. 6B, unlike FIG. 6A, a matrix of four pixels in the lateral direction and eight pixels in the longitudinal direction is constituted, and an excessive value is set as a threshold only for a shaded square.

As described above, in a case where one pixel has an 8-bit gradation value, for example, "128" is set as the fixed threshold, and "10" is set as the excessive threshold. When the quantization threshold decreases, the quantized value of a pixel of interest readily becomes "1" (quantization representative value "255"). That is, in both FIGS. 6A and 6B, the quantized values "1" are easily arranged in the arrangement of shaded squares in FIGS. 6A and 6B. In other words, blocks in which dots are generated in the arrangement of shaded squares in FIG. 6A, and blocks in which dots are generated in the arrangement of shaded squares in FIG. 6B coexist for every block of N×M pixels.

In the error diffusion method, a small change of the quantization threshold does not greatly influence the image quality. In the ordered dither method, the image quality of the gradation representation greatly depends on a dither pattern to be used. However, in the error diffusion method that regularly gives a change of the quantization threshold, the gradation representation that determines the image quality is only the error diffusion method. Thus, the arrangement of dots may slightly change, or the generation of a texture may change, which hardly influences the image quality of the gradation representation. Even in a case where the quantization threshold changes, an error serving as a difference between an image signal value and a quantized value is diffused to adjacent pixels, and the input image signal value is saved macroscopically. That is, in a case where the error diffusion method is used, redundancy is very large as for the arrangement of dots and generation of a texture.

In the above-described example, multiplexing is implemented by superimposing predetermined periodicity representing a code on a quantization threshold in the error diffusion method. However, the following methods are also conceivable:

a method of directly superimposing periodicity on brightness information of R, G, and B;

a method of dividing brightness information of R, G, and B into brightness-color difference information (for example, Y, Cr, and Cb signals), and multiplexing periodicity; and a method of dividing brightness information of R, G, and B into ink colors (for example, C, M, Y, and K signals), and multiplexing periodicity.

As described above, according to this embodiment, bit data ("bit=0" or "bit=1") representing additional information is associated with the quantization condition A or B by the processes in steps S406 to S408. By performing quantization processing associated with the bit data in step S409, image information is printed by a printer. More specifically, the bit "0" or "1" can be expressed based on which of the quantization conditions A and B is used in the above-described quantization processing. Quantization is performed by switching over the quantization condition A or B in accordance with the bit data "0" or "1" representing additional information, image information is printed, and the additional information can be multiplexed.

The camera-equipped mobile terminal 104 captures a print sheet on which the above-mentioned image information is printed, and analyzes the captured image. By this analysis, it is determined which of the quantization conditions A and B is a quantization condition used for the image information. By repeating this determination, information representing the determined quantization condition A or B is converted into a bit string, and the additional information can be reproduced.

Analysis of a captured image, determination of the quantization condition, and reproduction of additional information by the camera-equipped mobile terminal 104 will be explained below.

Next, the additional information demultiplexing unit 106 in the image processing system shown in FIG. 1 will be explained.

FIG. 7 is a block diagram showing the arrangement of the additional information demultiplexing unit 106.

For descriptive convenience, an example of demultiplexing additional information from a print product in which each 1-bit additional information is multiplexed in a divided block will be explained, as in the example of the above-described additional information multiplexing unit 102. Needless to say, the additional information amount per block in the additional information multiplexing unit equals the demultiplexing information amount per block in the additional information demultiplexing unit.

As shown in FIG. 7, image information read by the camera-equipped mobile terminal 104 is input from an input terminal 700. The resolution of the image capturing sensor 105 of the camera-equipped mobile terminal 104 to be used is desirably equal to or higher than the resolution of the printer 103 that prints a print product. As a matter of course, to accurately read scattering information of dots on a print product, the resolution needs to be double or more on the image capturing sensor side than on the printer side according to the sampling theorem. However, if the resolution is equal or higher, scattering of dots can be determined to a certain degree though it may be inaccurate. This embodiment therefore assumes that the resolution of the printer and that of the image capturing sensor 105 are equal for descriptive convenience.

A geometric shift detection unit 701 detects a geometric shift (such as a slant of a print product in a captured image) of an image captured by the camera-equipped mobile terminal 104. Needless to say, image information input from the input terminal 700 sometimes geometrically greatly shifts from image information before output by the printer 103 because the image information is input after output by the printer 103 and shooting by the camera-equipped mobile terminal 104. Hence, the geometric shift detection unit 701 performs edge detection of the boundary between a print product and an image other than the print product.

FIG. 8 is a view showing the relationship with a print product included in a captured image.

If the printer resolution and the image capturing sensor resolution are equal, a large factor to be corrected is the rotation (tilt) of an image caused by, for example, a skew of a print medium that occurs at the time of printing on the print medium by the printer, or a shift that occurs when the camera-equipped mobile terminal 104 is held over the print product. By detecting the boundary of the print product, the degree of rotation of the print product by which the shift occurs can be determined.

An input terminal 720 inputs information about movement of the camera from a sensor (gyrosensor (angular velocity sensor) or acceleration sensor) mounted in the camera-equipped mobile terminal 104. A moving vector estimation unit 730 receives the moving vector of the body of the camera-equipped mobile terminal 104 from the input terminal 720 and a shift, from the geometric shift detection unit 701, of an image obtained by capturing a print product. Then, the moving vector estimation unit 730 estimates a shift direction and a relative shift amount between the captured image and the print product.

A block formation unit 702 segments an input image into blocks by every P pixels in the lateral direction and every Q pixels in the longitudinal direction. This block needs to be smaller than a block of N×M pixels at the time of superimposing a digital watermark. That is, the following relations are established:

$$P \leq N \text{ and } Q \leq M \quad (4)$$

Block formation of every P×Q pixels is skipped and executed at every given interval. More specifically, block formation is performed so that one block of P×Q pixels is included in an area assumed to be a block formed from N×M pixels at the time of multiplexing, as shown in FIG. 8. The number of skipped pixels is basically N pixels in the horizontal direction and M pixels in the vertical direction. However, it is necessary to divide, by the number of blocks, a shift amount detected by the geometric shift detection unit 701, calculate a shift amount per block, and add the shift amount to the number of skipped pixels, thereby correcting the number of skipped pixels.

Information of P×Q pixels of the block is sent to a feature amount calculation unit 740 to analyze a feature in the block. Based on information from the moving vector estimation unit 730, a feature amount change prediction unit 750 predicts a change of the feature amount from a state in which the positional relationship between the image capturing device and the print product is relatively stationary (to be referred to as an ideal state hereinafter). A determination unit 710 determines a code in the block based on the calculation result from the feature amount calculation unit 740 and the prediction from the feature amount change prediction unit 750.

As described above, according to this embodiment, the camera-equipped mobile terminal 104 analyzes a captured image to read additional information multiplexed on image information printed on a print sheet. In some cases, however, a blur may occur in a captured image owing to shooting that is performed while moving the camera-equipped mobile terminal 104 by the user, and it is hard to determine which of the bit "0" or the bit "1" is set in an analysis target area in the captured image.

However, in a case where deterioration of the feature amount of the analysis target area occurs owing to the image blur of the captured image, as described above, the way of deterioration has a tendency corresponding to a direction in which the image capturing device has moved. In this embodiment, therefore, the tendency of image deterioration is predicted in accordance with the direction in which the image capturing device has moved, and the original feature amount of the analysis target area is estimated from the tendency and the feature amount calculation result. A bit corresponding to the estimated feature amount is determined as a code indicated by the area. According to this embodiment, even though the positional relationship between the image capturing device and the print product greatly shifts from the ideal state, the decoding performance is not impaired. This will be explained in detail below.

Next, the processing procedures of the feature amount calculation unit 740 and determination unit 710 in the ideal state will be explained for descriptive convenience.

A spatial filter A 703 and spatial filter B 704 having different characteristics are connected to dedicated digital filtering units 705 that calculate the product sum of values of adjacent pixels. Each coefficient of the spatial filter is created adaptively to the period of the variable threshold of the quantization condition at the time of multiplexing. Assume that additional information is multiplexed by using two types of periodicity in FIGS. 6A and 6B to change the quantization condition in the multiplexing unit.

FIGS. 9A and 9B are views showing examples of the spatial filter used in the additional information demultiplexing unit.

FIGS. 9A and 9B show examples of the spatial filter A 703 and spatial filter B 704 used in the additional information demultiplexing unit in a case where an image in which additional information is multiplexed by using the two types of periodicity in FIGS. 6A and 6B is input. In these drawings, the center portion of 5×5 pixels serves as a pixel of interest, and the remaining 24 pixels serve as adjacent pixels. In FIGS. 6A and 6B, pixels at blank portions represent that the filter coefficient is "0". As is apparent from these drawings, the filters shown in FIGS. 9A and 9B are edge enhancement filters. In addition, the directionality of an edge to be enhanced and the directionality of the variable threshold upon multiplexing coincide with each other. That is, the spatial filters are created so that the spatial filter in FIG. 9A coincides with the periodicity in FIG. 6A and the spatial filter in FIG. 9B coincides with the periodicity in FIG. 6B.

A thinning unit A 706 and thinning unit B 707 perform thinning processing based on given regularity on signals (to be referred to as converted values hereinafter) after filtering in a block formed from P×Q pixels. In the first embodiment, the thinning regularity is separated into periodicity and phase to perform processing. More specifically, the thinning unit A 706 and the thinning unit B 707 are different from each other in thinning periodicity, and execute a plurality of thinning processes in which the phase is changed. The thinning method will be described later.

Converted values respectively thinned out by the thinning unit A 706 and the thinning unit B 707 are input to two corresponding converted value addition units 708, and are added for the respective phases. The thinning processing and the converted value addition processing are equivalent to an extracting power of a predetermined frequency vector enhanced by the spatial filter. Two variance calculation units 709 calculate the variances of a plurality of values added for the respective phases in the respective periodicities. A determination unit 710 determines a multiplexed code based on the variances in the respective periodicities.

FIG. 10 is a view showing an outline of the processing in a two-dimensional frequency region according to this embodiment. In FIG. 10, an abscissa fx indicates the frequency in the horizontal direction, and an ordinate fy indicates the frequency in the vertical direction. The origin serving as the center indicates a DC component, and the frequency increases as it moves apart from the origin. A circle in FIG. 10 indicates a cutoff frequency by error diffusion. The filter characteristic of the error diffusion method indicates the characteristic of an HPF (High Pass Filter) in which a low-frequency region is cut off. The frequency to be cut off changes in accordance with the density of a target image.

By changing the quantization threshold, a frequency characteristic generated after quantization changes. A large power spectrum is generated on a frequency vector A shown in FIG. 10 by a change of the quantization threshold in FIG. 6A, and on a frequency vector B shown in FIG. 10 by a change of the quantization threshold in FIG. 6B. Upon demultiplexing additional information, detection of a frequency vector on which a large power spectrum is generated leads to determination of a multiplexed signal. More specifically, the variance calculation unit 709 calculates the dispersion of the frequency in an analysis target block. The determination unit 710 determines which of A and B in FIG. 10 corresponds to the dispersion calculated by the variance calculation unit 709. From this, it can be determined which of the quantization conditions in FIGS. 6A and 6B corresponds to the quantization condition used for this area at the time of printing. That is, which of the codes "0" and "1" as the bit of additional information corresponds to this area can be determined. To achieve this, it is necessary to individually enhance and extract the respective frequency vectors.

The spatial filters shown in FIGS. 9A and 9B are equivalent to HPFs each having the directionality of a specific frequency vector. More specifically, the spatial filter shown in FIG. 9A can enhance a frequency vector on the straight line A, and the spatial filter shown in FIG. 9B can enhance a frequency vector on the straight line B.

For example, assume that a large power spectrum is generated on the frequency vector of the straight line A shown in FIG. 10 by a change of the quantization condition in FIG. 6A. At this time, the change amount of the power spectrum is amplified by the spatial filter in FIG. 9A, but is hardly amplified by the spatial filter in FIG. 9B. That is, in a case where a plurality of spatial filters perform filtering in parallel, the power spectrum is amplified only by a spatial filter coincident with the frequency vector, and is hardly amplified by other filters. Thus, a frequency vector on which a large power spectrum is generated can be easily identified.

More specifically, the determination unit 710 compares processing results by the spatial filter A 703 and the spatial filter B 704 to determine which of A in FIG. 10 and B in FIG. 10 corresponds to the dispersion of the frequency in the analysis target block. A in FIG. 10 and B in FIG. 10 each serving as the tendency of the dispersion of the frequency correspond to the quantization conditions shown in FIGS. 6A and 6B, and the quantization condition corresponds to the bit ("0" or "1") serving as additional information. The determination unit 710 can therefore determine which of the codes "0" and "1" as the bit of additional information is represented by the analysis target block. This will be explained in detail below.

Figure 11:
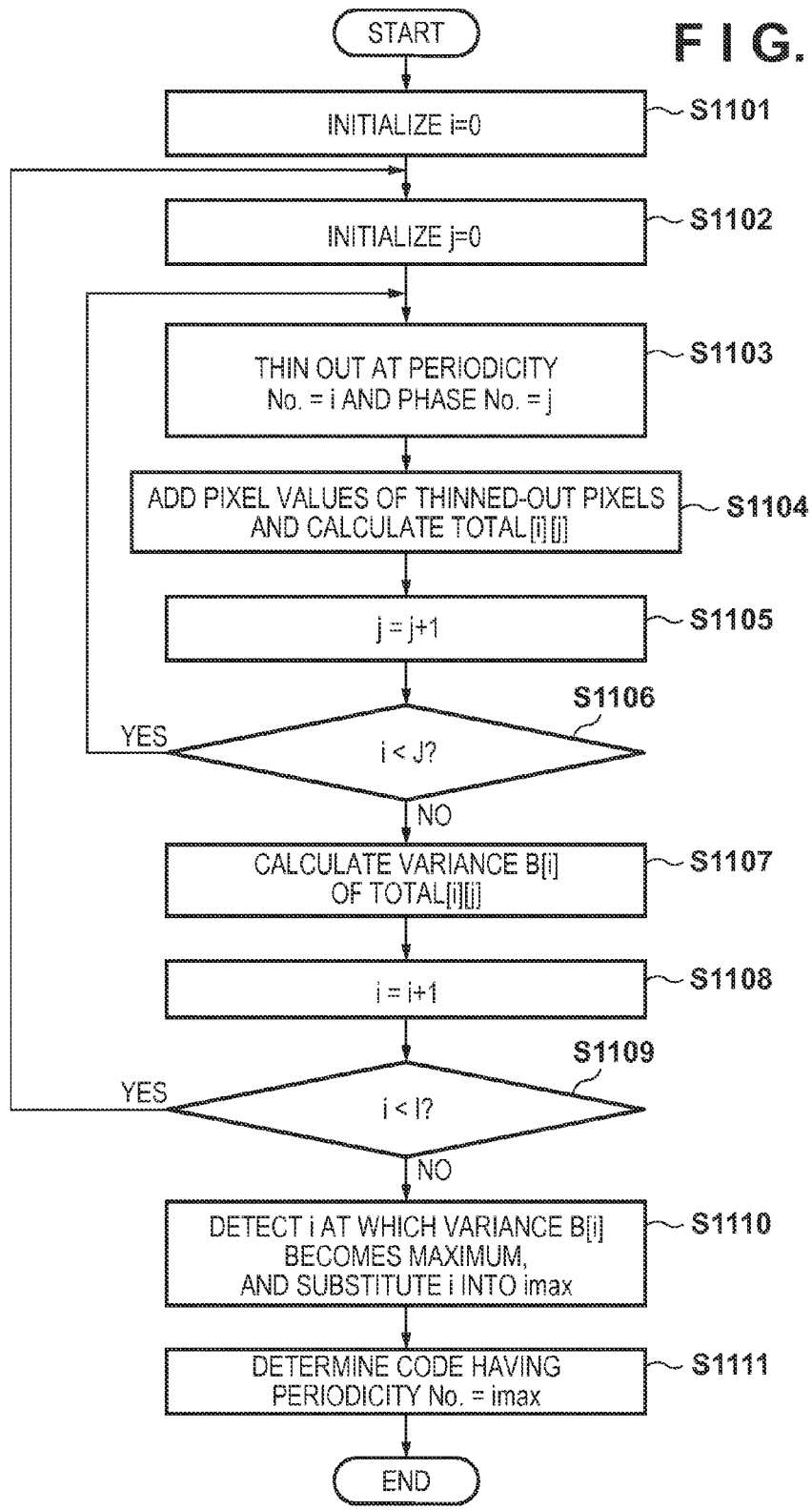
FIG. 11 is a flowchart showing an additional information decoding operation to be executed by a thinning unit A, a thinning unit B, converted value addition units, variance calculation units, and a determination unit.

FIG. 11 is a flowchart showing an operation to be executed by the thinning unit A 706, the thinning unit B 707, the converted value addition units 708, the variance calculation units 709, and the determination unit 710.

In steps S1101 and S1102, the values of the variables i and j are initialized to "0". In step S1103, factors of the thinning regularity by the thinning unit A 706 and the thinning unit B 707, that is, two factors "periodicity" and "phase" are determined. Here, i is a variable regarding the periodicity, and j is a variable regarding the phase. The conditions of the periodicity and phase are managed by the number. Thinning method factors having a periodicity number (to be referred to as No. hereinafter) of i and a phase No. of j are set.

In step S1104, converted values thinned out in a block are added, and the addition value is stored as a variable array TOTAL [i][j].

The variable j is incremented by one in step S1105, and compared with a fixed value J in step S1106. J is the number of times by which the phase is changed to perform thinning processing. J is stored in a memory or a register. If the variable j is smaller than J (j<J), the process returns to step S1103 to repeat thinning processing and thinned-out pixel addition processing for a new phase No. indicated by the incremented variable j.

To the contrary, if it is determined that j≥J and phase-shifted thinning processing and addition processing have been performed the set number of times, the process advances to step S1107 to calculate the variance of the addition result TOTAL [i][j]. That is, the degree of dispersion of respective addition results depending on the phase difference is evaluated. In this case, the i value is fixed, and the variances of J addition results TOTAL [i][j] are obtained. The variance is B [i].

The variable i is incremented by one in step S1108, and the variable i and a fixed value I are compared in step S1109. The fixed value I is the number of times by which the periodicity is changed to perform thinning processing. I is stored in a memory or a register. If the variable i is smaller than I (i<I), the process returns to step S1102 to repeat thinning processing and converted value addition processing again by using a new periodicity No. condition indicated by the value of the incremented variable i. To the contrary, if it is determined that i≥I and thinning processing and addition processing have been performed the set number of times, the process advances to step S1110. At this time, I variances B[i] have been calculated.

In step S1110, the maximum value of the variance is detected from a set of I variances, and the value of the variable i at this time is substituted into a variable imax. Finally, in step S1111, it is determined that a code having a periodicity No. of imax is a multiplexed code, and then the process ends.

Here, an example in which I=2 and J=4 will be explained.

FIGS. 12 and 13 are views showing in the table format a thinning method in a case where the block size is P=Q=16. In FIGS. 12 and 13, one square in the block represents one pixel. In FIGS. 12 and 13, the block shape is P=Q=square. However, the block shape is not limited to a square and may be a rectangle in which P≠Q.

FIG. 12 shows a thinning method (equivalent to the thinning unit A 706 in FIG. 7) in a case where the periodicity No.=0. FIG. 13 shows a thinning method (equivalent to the thinning unit B 707 in FIG. 7) in a case where the periodicity No.=1. In these drawings, a value indicated by each pixel in the block represents a thinned-out pixel for the phase No.=j. For example, a pixel displayed as "0" corresponds to a thinned-out pixel for j=0. That is, there are four phases in both FIGS. 12 and 13, which are equivalent to a thinning method in a case where the phase No. is j=0 to 3.

As for the periodicities shown in FIGS. 12 and 13, the periodicity in FIG. 12 coincides with the periodicity in FIG. 6A, and the periodicity in FIG. 13 coincides with the periodicity in FIG. 6B. As described above, quantized values "1" (in the case of binary values "0" and "1") are easily arranged in the arrangement of shaded squares in both FIGS. 6A and 6B. For example, in the case of a block corresponding to the quantization condition A at the time of multiplexing, quantized values "1" are easily arranged with the periodicity of FIG. 6A, and the frequency component is further amplified at the time of a matched spatial filter. In a case where converted values are thinned out and added with the periodicity shown in FIG. 12, the variance of the addition result increases.

Compared to this, in a case where a block corresponding to the quantization condition A is filtered using an unmatched spatial filter, and thinning is executed with the periodicity shown in FIG. 13, the variance value of the addition result of converted values decreases. Since the periodicity of the quantized value and the periodicity of thinning are different, the addition values of converted values depending on the difference of the phase of thinning become average, and the variance decreases. To the contrary, in a block corresponding to the quantization condition B at the time of multiplexing, the variance is decreased by thinning shown in FIG. 12, and increased by thinning shown in FIG. 13.

In application to the above-described processing according to the flowchart shown in FIG. 4, bit=0 is set as the quantization condition A, and bit=1 is set as the quantization condition B. Thus, it can be determined that bit=0 in a case where the variance at the periodicity No.=0 is large, and bit=1 in a case where the variance at the periodicity No.=1 is large.

That is, multiplexing of additional information and demultiplexing of the additional information can be easily implemented by associating the quantization condition, the spatial filter characteristic, and the periodicity of the thinning condition.

In this embodiment, the periodicity No. takes two values of 0 and 1, and the multiplexing code in a block is 1 bit. However, the multiplexing code may be larger, as a matter of course. The type of the quantization condition, the type of the spatial filter, and the type (I value) of the periodicity No. of the thinning condition coincide with each other.

In this embodiment, the code can be easily separated without comparing the power values of frequencies corresponding to the regularities of the quantization conditions by orthogonal transformation. In addition, additional information demultiplexing processing can be implemented at very high speed because of processing in a real space domain.

Although the embodiment has been explained above, the quantization conditions A and B, the spatial filters A and B, and the thinning units A and B are merely examples, and the present invention is not limited to them. Another periodicity may be given, or the number of taps of the spatial filter, the thinning block size, and the like may be larger or smaller than those in the above-mentioned example.

The flowchart shown in FIG. 11 uses repetitive processing based on the variable i indicating the periodicity No. and the variable j indicating the phase No. in order to simply explain the concept of the present invention. In practice, however, the method of repetitive processing based on a pixel address in a block formed from P×Q pixels is easily implemented. More specifically, as shown in FIGS. 12 and 13, two types of information, that is, the periodicity No. and the phase No. are stored in advance as a table for each pixel address in the block, and converted values are added to the respective variables of the corresponding periodicity No. and phase No. According to this method, the addition values of respective sets of the periodicity No. and phase No. can be calculated in parallel by only processing P×Q pixels.

Further, in the procedures of the flowchart shown in FIG. 11, the variances of the addition results of thinned-out converted values after the spatial filter are calculated, and the code is determined by comparing the variances. However, the present invention is not limited to this. A method by a comparison based on an evaluation function without using the variance is also conceivable. The deviation of the addition results of thinned-out converted values suffices to evaluate the "degree of dispersion" because a value tends to outstand in only one phase upon shifting the phase.

For example, to evaluate the degree of dispersion, the following evaluation functions other than the variance are conceivable:

1. the difference between maximum and minimum values among addition values obtained by adding thinned-out converted values
2. either of the difference between a maximum value and a second maximum value among addition values obtained by adding thinned-out converted values, and the difference between a minimum value and a second minimum value
3. a maximum value among preceding and succeeding differences at the time of creating the histogram of addition values obtained by adding thinned-out converted values.

In the ideal state, decoding can be performed in the above-described manner.

Next, an actual situation divergent from the ideal state will be explained by exemplifying continuous shooting of a print product in which additional information is multiplexed by the camera-equipped mobile terminal 104. In this embodiment, a case in which a large amount of data such as voice data or moving image data is added to a print product will be considered. Continuous shooting will be described on the assumption that information is embedded in the entire print product.

When reading multiplexed information of a print product by the camera-equipped mobile terminal 104, the camera-equipped mobile terminal 104 needs to be brought close to the print product up to a distance at which the modulated periodical pattern (multiplexed pattern) can be analyzed. However, if the multiplexed information is embedded in the entire print product, the multiplexed information in the entire range of the print product cannot be captured by one shooting owing to the reading resolution or the like. It is therefore necessary to capture the entire range separately as a plurality of images while moving the camera-equipped mobile terminal 104 above the print product. This will be called "continuous shooting" in this embodiment.

Details of continuous shooting will be explained with reference to the drawings.

Figure 14:
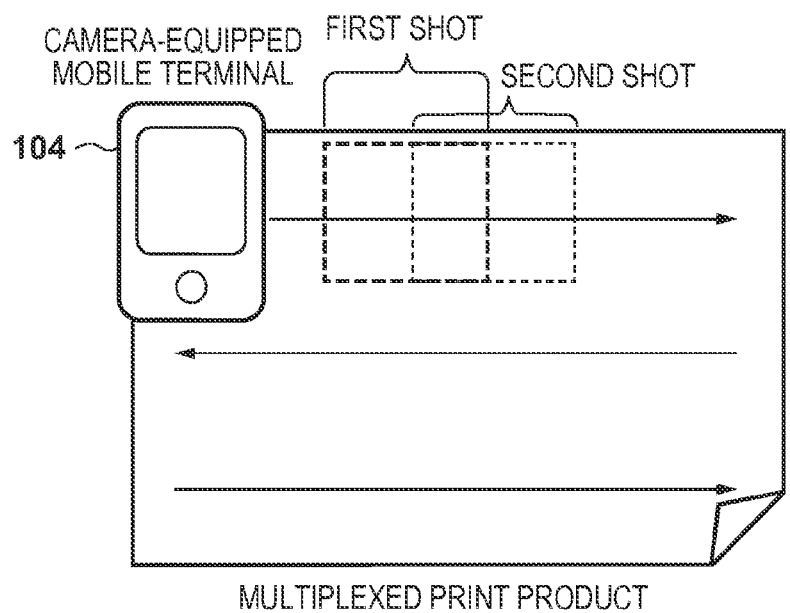
FIG. 14 is a schematic view showing the state of continuous shooting.
Figure 15:
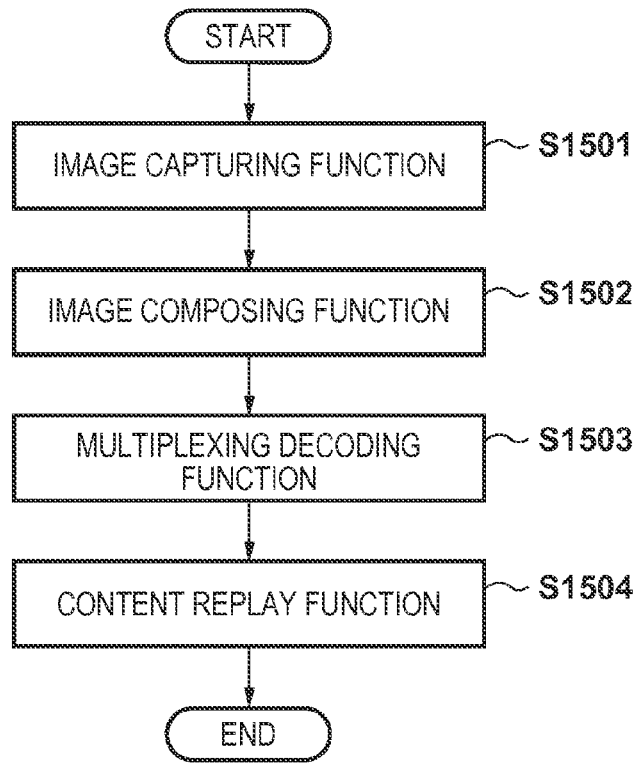
FIG. 15 is a flowchart showing processing of continuous shooting.

FIG. 14 is a schematic view showing the state of continuous shooting. FIG. 15 is a flowchart showing processing of continuous shooting.

First, the user activates a multiplexing decoding application (to be referred to as an application hereinafter) of the camera-equipped mobile terminal 104. This application has four functions in the processing order, as shown in FIG. 15. More specifically, an image capturing function of capturing a print product is executed in step S1501, and an image composing function of composing a plurality of images is executed in step S1502. In step S1503, a multiplexing decoding function of reading a multiplexed pattern from the composed image and decoding it based on the evaluation of the continuity is executed. Finally, in step S1504, a content replay function of replaying the decoding result from the loudspeaker 108 of the camera-equipped mobile terminal 104 or displaying it on the display 109 is executed.

Then, the user positions the camera-equipped mobile terminal 104 at the upper left portion of the print product, and adjusts it to a height at which the multiplexed pattern can be read.

In this case, shooting is started by the image capturing function in step S1501, and continuous shooting is performed while moving the camera-equipped mobile terminal 104 rightward, as shown in FIG. 14. As for a range where every image is captured, a plurality of images are aligned by the image composing function in step S1502, or the shooting region is superimposed on that of a preceding image in order to compose a plurality of images into one image. In this manner, continuous shooting is performed.

In continuous shooting, if the moving speed of the camera-equipped mobile terminal 104 is excessively high, shooting may delay at a shutter speed set at the start of continuous shooting, and an omission may be occurred in the shooting region of a print product. In this case, for example, a display that instructs the user to decrease the moving speed is displayed on the display 109 of the camera-equipped mobile terminal 104. Alternatively, the moving speed is calculated from an acceleration sensor 110 of the camera-equipped mobile terminal 104 to automatically set a shutter speed corresponding to the moving speed. It is also possible to calculate an uncaptured area in a print product and display it to the user while compositing captured images.

In any case, after the end of capturing one line of the print product, as shown in FIG. 14, the camera-equipped mobile terminal 104 is moved down by one line, and continuous shooting is similarly performed while moving the camera-equipped mobile terminal 104 leftward. In this way, continuous shooting is performed to the end without any omitted range while scanning the entire range of the print product on which additional information is multiplexed. Note that the moving direction of the camera-equipped mobile terminal 104 is not limited to one shown in FIG. 14. As long as the range in which multiplexed information is embedded is covered, the moving direction of the camera-equipped mobile terminal 104 and the size of an overlapped area are arbitrary.

After that, the image composing function in step S1502 is executed, and a plurality of captured images are composed. By detecting the order in which images were captured, and an overlapped area in continuous images, a plurality of captured images are composed. Composition processing to be performed here is, for example, generally known panoramic composition processing. It is also possible to calculate a moving direction and moving distance by the acceleration sensor 110 of the camera-equipped mobile terminal 104, and compose a plurality of images based on the results.

Then, the multiplexing decoding function in step S1503 is executed, and embedded multiplexed information is decoded from the composed image. Details of the decoding processing have already been explained with reference to FIG. 7, and a description thereof will not be repeated. Even if a plurality of images are composed in step S1502, multiplexed information may not be read correctly in step S1503. In this case, a message that the image capturing function in step S1501 is executed again to perform continuous shooting is displayed on the display 109 of the camera-equipped mobile terminal 104, thereby prompting the user to perform reshooting.

Finally, in step S1504, the content replay function is executed to replay the decoded additional information by the camera-equipped mobile terminal 104. The content is a file that can be opened by the camera-equipped mobile terminal 104, such as voice data, moving image data, image data, a link on the Internet, or text data. However, the type of the file is arbitrary. For example, if multiplexed information embedded in a print product is moving image data, the moving image data is replayed in step S1504, or another moving image replay application stored in the camera-equipped mobile terminal 104 is linked to replay the moving image data.

In continuous shooting, shooting may be performed in a continuous shooting mode for still images, or after shooting in a moving image mode, frames may be extracted one by one to divide the moving image as image data. A case has been explained, in which in step S1501, the application obtains a calculation result from the acceleration sensor 110, instructs the image capturing sensor 105 about an image capturing condition based on the results, and obtains a plurality of captured images. However, shooting may be performed not by the camera function of the camera-equipped mobile terminal 104 but by a digital still camera (image capturing device). In this case, a plurality of continuously captured images are loaded into a personal computer or the like, the multiplexing decoding application is activated on the OS of the personal computer, and the plurality of loaded images are composed and decoded.

In a case where the image capturing device is operated in the above-described way, an image blur in the horizontal direction increases, and the state is greatly divergent from the ideal state. A blur then occurs in the captured image, and even if the code of additional information is determined by the processing in FIG. 11, appropriate determination may not be performed.

However, in a case where the feature amount of the analysis target area is deteriorated by the image blur of the captured image, as described above, the way of deterioration has a tendency corresponding to a direction in which the image capturing device has moved. In this embodiment, therefore, the tendency of image deterioration is predicted in accordance with the direction in which the image capturing device has moved, and the original feature amount of the analysis target area is estimated from the tendency and the feature amount calculation result. A bit corresponding to the estimated feature amount is determined as a code indicated by the area.

Referring back to FIG. 7, processing in a case where the state is divergent from the ideal state will be explained. As shown in FIG. 7, the feature amount change prediction unit 750 includes a band A change prediction unit 751 and a band B change prediction unit 752. Based on a direction in which the image capturing device has moved at the time of shooting, the feature amount change prediction unit 750 predicts the tendency of deterioration of the feature amount corresponding to the direction. For example, in a case where an image blurs in the horizontal direction (right-and-left direction in FIG. 14), a high frequency component in the horizontal direction deteriorates. In a case where an image blurs in the vertical direction (top-to-bottom direction in FIG. 14), a high frequency component in the vertical direction deteriorates. The band A change prediction unit 751 and the band B change prediction unit 752 predict whether the feature amount is changed (cut off) in the vertical and horizontal directions, respectively. Note that the prediction is performed based on a moving vector (equivalent to the moving direction of the image capturing device) estimated by the moving vector estimation unit 730. This will be explained in detail below with reference to FIGS. 16A and 16B.

Figure 16A:
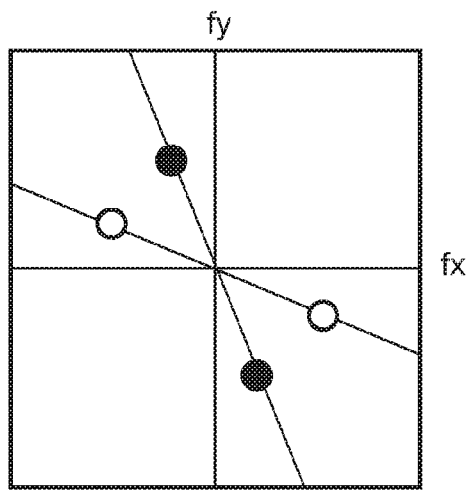
FIGS. 16A and 16B are views showing an image blur in the horizontal direction in the frequency space.
Figure 16B:
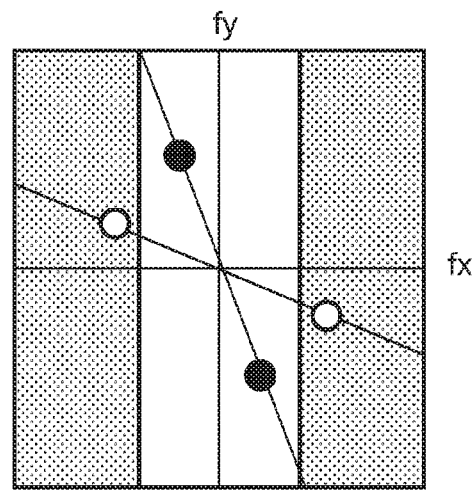

FIGS. 16A and 16B are views showing an image blur in the horizontal direction in the frequency space. In FIGS. 16A and 16B, the abscissa indicates a frequency fx in the horizontal direction, and the ordinate indicates a frequency fy in the vertical direction. The origin serving as the center indicates the DC component of the image, and the frequency component becomes higher as it moves apart from the origin.

In a case where the quantization threshold is changed, a frequency characteristic generated after quantization also changes. Large power is generated in a band (band A) indicated by filled circles in FIG. 16A by a change of the quantization threshold in FIG. 6A, and in a band (band B) indicated by open circles in FIG. 16A by a change of the quantization threshold in FIG. 6B.

FIG. 16B shows a frequency distribution in a case where an image blurs in the horizontal direction. In FIG. 16B, dotted bands on two, left and right ends represent high frequency bands assumed to be cut off by a horizontal blur. As is apparent from the example of FIG. 16B, the open circles (bands B) are included in the high frequency bands to be cut off. The degree by which the band is cut off can be determined from a signal from the moving vector estimation unit 730. In a case where the bands indicated by the open circles are cut off in this manner, a modulated signal is lost by the change of the quantization threshold in FIG. 6B. In the case of a blur in the horizontal direction, the reproducibility of the frequency band in the vertical direction can be maintained.

The band A change prediction unit 751 and the band B change prediction unit 752 receive a moving information signal from the moving vector estimation unit 730, and predict degrees of influence on the respective bands.

In the example shown in FIG. 16A, the change is a movement in the horizontal direction, and it is assumed that the dotted bands in FIG. 16B are cut off. Hence, a signal representing "not change" is transmitted from the band A change prediction unit 751 to the determination unit 710, and a signal representing "cut off" is transmitted from the band B change prediction unit 752 to the determination unit 710.

In a case where these signals are transmitted to the determination unit 710, if the feature amount of the analysis target block is one corresponding to B in FIG. 10, a large value is not calculated as a feature amount in the result of calculation by the feature amount calculation unit 740. In contrast, if the feature amount is one corresponding to A in FIG. 10, it is considered that the feature amount will not change and the feature amount calculation unit 740 will appropriately calculate a feature amount which corresponds to A in FIG. 10 and is larger than a predetermined feature amount. From this, a case will be considered, in which the feature amount calculation unit 740 does not calculate a large value as a feature amount in both the horizontal and vertical directions. In this case, it can be estimated that the feature amount of the block is originally one corresponding to B of FIG. 10, but the influence of an image blur in the horizontal direction is large, and the feature amount is cut off.

In this case, the determination unit 710 can determine that the feature amount of the block is originally one corresponding to B in FIG. 10, and a quantization condition corresponding to the block is a quantization condition corresponding to B in FIG. 10. That is, the determination unit 710 can determine that the code (0 or 1) of additional information indicated by the block is a code corresponding to B in FIG. 10.

In this fashion, the determination unit 710 estimates an original feature amount from the tendency of the change (deterioration) from the original feature amount that is predicted by the band A change prediction unit 751 and the band B change prediction unit 752, and the feature amount calculation result by the feature amount calculation unit 740. According to this estimation, even in a case where a feature amount larger than a predetermined feature amount is not calculated in the horizontal and vertical directions owing to an image blur, a code corresponding to the analysis target block can be determined.

As described above, this embodiment pays attention to a deviation indicated by outputs from the two change prediction units. Even if a signal is lost, it can be easily decoded.

FIG. 17 is a flowchart showing the operation procedures of the thinning units 706 and 707, the converted value addition units 708, the variance calculation units 709, and the determination unit 710 at the time of divergence from the ideal state. In FIG. 17, the same step reference symbols as those already described with reference to FIG. 11 denote the same processing steps, and a description thereof will not be repeated.

In FIG. 17, if it is determined in step S1109 that i≥I, the process advances to step S1109A to compare the variance value at each calculated periodicity with a predetermined threshold set in advance. If it is determined that there is periodicity having a variance value exceeding the threshold, the process advances to step S1110 to detect the maximum value of the variance value from a set of I variance values, and substitute the i value at that time into the variable imax, as described with reference to FIG. 11. Further, in step S1111, it is determined that a code having the periodicity No. of imax is a multiplexed code. After that, the process ends.

To the contrary, if it is determined that all variance values are equal to or smaller than the predetermined threshold, the process advances to step S1109B to determine that the code is highly likely to be one having the cut-off periodicity No., and determine that this code is a code in the cutoff band. The process then ends.

As described above, according to this embodiment, code determination is performed by positively using information that all variance values are small. For example, assume that in a case where there are two modulations (that is, events), one modulation band is reproduced, and the other modulation band is cut off. If a modulation signal falls within the reproduction band, the signal can be reproduced with almost no problem. However, if a modulation signal falls within the cutoff band, whether the modulation signal has already fallen within the cutoff band is not determined from only this. The modulation band itself is cut off, so even if the deterioration characteristic can be estimated, restoration of the modulation signal by performing image correction by inverse-transformation of the deterioration characteristic is impossible.

However, if a modulation signal of another band does not exist in this block, decoding can be performed based on information "no modulation signal exists." That is, in a case where there are two events, if a phenomenon "not reproduced" occurs, it can be estimated that this phenomenon represents a code opposite to that of an event "something is reproduced". In the ideal state, the code is determined simply by relative comparison of the feature amount. However, in a state divergent from the ideal state, the simple relative comparison is insignificant. In a case where a deviation occurs in the reproduction of the code, the code determination method and determination condition need to be changed dynamically.

Therefore, the above-described embodiment pays attention to a deviation indicated by outputs from the two change prediction units. Even though a signal is lost, it can be easily decoded, and the tolerance to a camera shake by camera movement can be greatly improved. In the example shown in FIGS. 16A and 16B, the cutoff band is reversed between a horizontal camera shake and a vertical camera shake. In a case where it is determined that "no modulation signal exists", the code is reversed in accordance with the moving direction. In this manner, the code determination condition can be changed in accordance with the moving vector.

Second Embodiment

Figure 18:
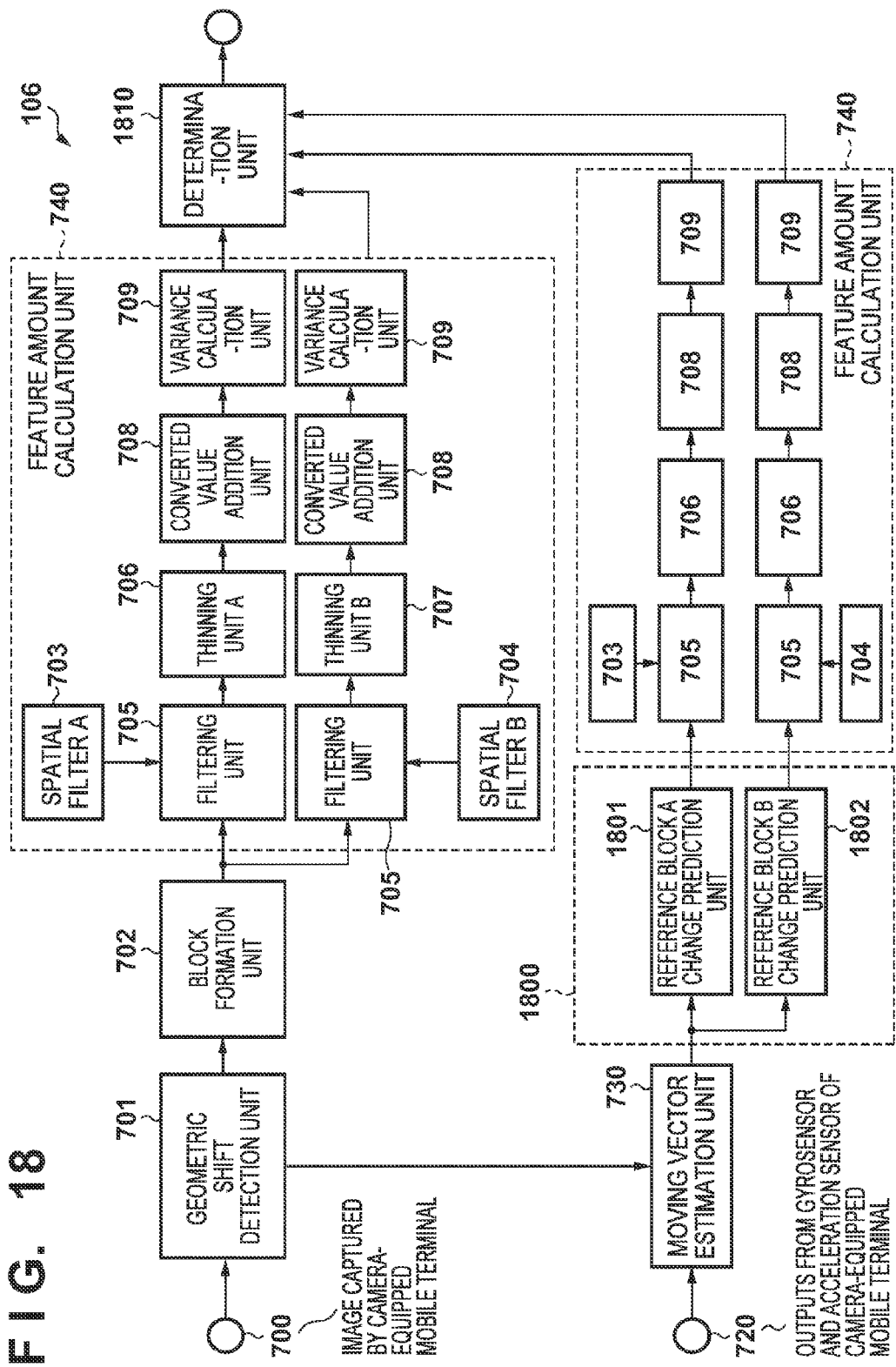
FIG. 18 is a block diagram showing the arrangement of an additional information demultiplexing unit according to the second embodiment.

FIG. 18 is a block diagram showing the arrangement of an additional information demultiplexing unit according to the second embodiment. In FIG. 18, the same reference numerals as those described with reference to FIG. 7 denote the same parts, and a description thereof will not be repeated.

As is apparent from a comparison between FIGS. 18 and 7, an additional information demultiplexing unit 106 according to the second embodiment includes two feature amount calculation units 740 described with reference to FIG. 7. One of the feature amount calculation units 740 receives an image of a block formed by a block formation unit 702, and the other feature amount calculation unit 740 receives a prediction result from a reference block change prediction unit 1800. A determination unit 1810 receives calculation results from the two feature amount calculation units 740 and determines a code.

The reference block change prediction unit 1800 includes a reference block A change prediction unit 1801 and a reference block B change prediction unit 1802. The reference block A change prediction unit 1801 and the reference block B change prediction unit 1802 predict changes of a preset reference block depending on the moving vector.

FIGS. 19A and 19B are views showing examples of the reference block.

FIG. 19A shows a reference block A, and FIG. 19B shows a reference block B. The reference blocks A and B are formed by applying periodicities shown in FIGS. 6A to 6B to every P×Q pixels. Note that the reference block is desirably generated by actually changing a quantization threshold with respect to a virtual block having a uniform density. Essentially in the ideal state, a predetermined periodicity appears as in the reference block. The reference block A change prediction unit 1801 and the reference block B change prediction unit 1802 predict how the pixel value of the reference block changes depending on a camera shake. More specifically, a camera shake filter characteristic generated by a camera shake of a camera-equipped mobile terminal 104 in a predetermined direction is predicted to create an image. The image in the block that is predicted by each reference block change prediction unit is sent to the corresponding feature amount calculation unit 740, and a variance value is calculated in the same manner as in the above-described embodiment.

The determination unit 1810 determines a code based on the variance values transmitted from the two feature amount calculation units.

FIG. 20 is a flowchart showing processing of determining a code based on variance values output from two feature amount calculation units.

First, in step S2001, a variance value B[i] of one block of an input image and a variance value (to be referred to as B'[i] hereinafter) after reference block change prediction are input. The variance value calculation method is the same as the method shown in FIG. 11. Then, in step S2002, the similarity between the variance value of the input image and the variance value after reference block change prediction is determined by calculating the difference between B[i] and B'[i].

In step S2003, a code having a periodicity No. at which the similarity is highest among the calculated similarities (that is, the difference is smallest) is determined as a multiplexed code, and the process ends.

A feature of this embodiment is evaluation using similarity. More specifically, in this embodiment, an input image is deteriorated by a camera shake filter predicted from a camera shake, creating a blur image. The similarity between the actually input blur image and the pseudo blur image created by prediction is determined.

An example in which a high frequency component in the horizontal direction by a camera shake in the horizontal direction shown in FIGS. 16A and 16B is cut off will be considered. In this case, the periodicity does not change in the image of the reference block A, and the periodicity is greatly lost in the image of the reference block B. As for the variance value in the reference block change prediction, the variance value of the reference block A is large, but that of the reference block B becomes small. Even in an actual input image, the attenuation of power in a multiplexed modulation band is deviated by a camera shake, so the variance value becomes greatly different from the ideal state. If the deviation of the attenuation of power can be predicted, decoding becomes possible without impairing the decoding performance.

According to this embodiment, even a moving camera shake in a direction other than the horizontal and vertical directions can be coped with as long as the moving angle can be estimated.

According to the above-described embodiment, the similarity between an actually input blur image and a pseudo blur image created by prediction is obtained, and a code can be determined from the similarity.

As a modification of the second embodiment, only the results of the reference block change prediction unit 1800 and the feature amount calculation unit 740 connected to it may be listed as an LUT (Look Up Table). More specifically, the predictive demultiplexed value of the reference block is calculated in advance for each moving vector and stored as a table in the memory. At the time of actual code determination, each demultiplexed value of the reference block that corresponds to a moving vector is read out from the table to make a determination. With this arrangement, decoding processing can be implemented very easily.

The present invention has been explained above by exemplifying several embodiments. In moving vector estimation, a plurality of input images may be analyzed to detect the moving direction of the camera without using the sensor of the image capturing device. In the present invention, the shooting object is a stationary print product. Thus, if the spatial position of the print product in a plurality of captured images can be determined, the moving direction of the camera can be easily detected. Camera shake characteristic prediction may be performed based on an image capturing condition such as the shutter speed, in addition to moving vector estimation. If the shutter speed increases, the obtained light amount decreases, which is advantageous to the camera shake.

Although the above-describe embodiments have explained an example in which the additional information demultiplexing unit 106 is integrated in the camera-equipped mobile terminal 104, the present invention is not limited to this. For example, it is also effective that a plurality of captured images or moving images obtained by capturing a print product by the image capturing device are transferred to another computer, and demultiplexing processing is performed in the computer upon receiving them. Even a replay device that replays information (for example, voice information) having undergone demultiplexing processing may be the same as or different from the device that has executed demultiplexing processing.

The reference block change prediction unit shown in FIG. 18 is applicable to various divergences from the ideal state, such as image capturing quality characteristics other than the camera shake characteristic, for example, a blur arising from the lens characteristic of the camera, a defocus, and the tilt of the camera at the time of shooting. If these image capturing quality characteristics can be predicted, the decoding performance can come close to the ideal state by using the similarity between feature amounts obtained from a prediction result and an actually input image. As for the prediction of these image capturing quality characteristics, a sensor integrated in the camera, the image capturing conditions (for example, shutter speed, exposure amount, sensitivity, and white balance) of the camera, and various kinds of information of image analysis can be used.

It is also considered to combine a method of performing shooting while changing the above-mentioned image capturing conditions (for example, shutter speed, exposure amount, sensitivity, and white balance) of the camera in a plurality of captured images or moving images, and selecting an optimal image. Selecting a more easily decodable image by performing so-called bracket shooting contributes to improvement of the decoding performance. In this case, the image capturing quality characteristics are desirably predicted in advance for each bracket.

Further, the method of multiplexing additional information has been exemplified with reference to FIG. 4, but the present invention is not limited to this. The method may be a multiplexing method of modulating additional information into a plurality of bands having different angles, and associating the difference between the modulation bands with a code. That is, any method is acceptable as long as the degree of influence based on the angle of the modulation band changes depending on the moving angle when moving the image capturing device, and the deviation of the code reproducibility increases.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-187035, filed Sep. 12, 2014, which is hereby incorporated by reference herein in its entirety.

What is claimed is:

1. An image processing apparatus comprising:
   an input unit configured to input an image obtained by capturing, by an image capturing device, a print product in which a digital watermark is embedded;
   an obtaining unit configured to obtain information about a moving direction of the image capturing device with respect to the print product in the image capturing of the print product; and
   a determination unit configured to, based on the information obtained by said obtaining unit or frequency characteristics in a partial area of the image input by said input unit, determine a code corresponding to the digital watermark embedded in the partial area,
   wherein, in a case where the partial area contains a frequency component higher than a predetermined frequency, said determination unit determines a code based on the frequency component, and
   in a case where the partial area does not contain a frequency component higher than the predetermined frequency, said determination unit determines a code based on the information obtained by said obtaining unit.

2. The apparatus according to claim 1, wherein
   said input unit inputs a plurality of images obtained by performing a continuous shooting of different areas on the print product, and
   said determination unit determines a code corresponding to a partial area in each of the plurality of images.

3. The apparatus according to claim 1, wherein said obtaining unit obtains information about the moving direction of the image capturing device based on a detection result of a sensor of the image capturing device.

4. The apparatus according to claim 1, wherein information is embedded in the digital watermark on the print product by modulating the frequency characteristics of the image.

5. The apparatus according to claim 4, wherein the information is embedded in the digital watermark by associating a difference in a band of the modulation with a code.

6. The apparatus according to claim 1, further comprising a detection unit configured to detect a geometric shift between the print product included in the image input by said input unit and the image captured by the image capturing device.

7. The apparatus according to claim 1, wherein said determination unit obtains the frequency characteristics by applying a filter regarding the frequency characteristics to an image input by said input unit.

8. The apparatus according to claim 1, wherein said obtaining unit obtains information about a blur of the image.

9. The apparatus according to claim 1, wherein said determination unit determines the code based on the information obtained by said obtaining unit, the frequency characteristics, and an image capturing condition of the image capturing device.

10. The apparatus according to claim 1, wherein said determination unit uses information about power in each specific band as the frequency characteristic, and determines the code based on the information.

11. The apparatus according to claim 10, wherein the information is information associated with deviation of power in said each specific band.

12. The apparatus according to claim 10, wherein the information is information associated with attenuation of power in said each specific band.

13. The apparatus according to claim 1, wherein the image capturing device is integrated in the image processing apparatus.

14. An image processing apparatus comprising:
an input unit configured to input an image obtained by capturing, by an image capturing device, a print product in which a digital watermark is embedded;
an obtaining unit configured to obtain information about a moving direction of the image capturing device with respect to the print product in the image capturing of the print product;
a detection unit configured to detect a geometric shift between the print product included in the image input by said input unit and the image captured by the image capturing device; and
a determination unit configured to, based on the information obtained by said obtaining unit or frequency characteristics in a partial area of the image input by said input unit, determine a code corresponding to the digital watermark embedded in the partial area,
wherein said obtaining unit obtains information about the moving direction of the image capturing device based on a detection result of a sensor that is integrated in the image capturing device,
said determination unit predicts, as a change of an image capturing quality characteristic, a change of the frequency characteristics of the image input by said input unit based on the geometric shift detected by said detection unit and the information from the sensor, and detects a motion of the image capturing device, and
said determination unit determines the code based on the prediction.

15. An image processing method comprising:
inputting an image obtained by capturing, by an image capturing device, a print product in which a digital watermark is embedded; and
based on information about a moving direction of the image capturing device with respect to the print product in the image capturing of the print product or frequency characteristics in a partial area of the input image, determining a code corresponding to the digital watermark embedded in the partial area,
wherein, in a case where the partial area contains a frequency component higher than a predetermined frequency, a code is determined in the determining, based on the frequency component, and
in a case where the partial area does not contain a frequency component higher than the predetermined frequency, a code is determined in the determining, based on the information.

16. The method according to claim 15, wherein
a plurality of images obtained by performing a continuous shooting of different areas on the print product are input in the inputting, and
a code corresponding to a partial area in each of the plurality of images is determined in the determining.

17. The method according to claim 15, wherein the information about the moving direction of the image capturing device is obtained based on a detection result of a sensor of the image capturing device.

18. The method according to claim 15, wherein the information is embedded in the digital watermark on the print product by modulating the frequency characteristics of the image.

19. The method according to claim 18, wherein the information is embedded in the digital watermark by associating a difference in a band of the modulation with a code.

20. The method according to claim 15, further comprising detecting a geometric shift between the print product included in the input image and the image captured by the image capturing device.

21. The method according to claim 20, wherein in the determining, a change of the frequency characteristics of the input image is predicted as a change of an image capturing quality characteristic, based on the detected geometric shift, and information from a sensor that is integrated in the image capturing device and a motion of the image capturing device is detected, and the code is determined based on the prediction.

22. The method according to claim 15, wherein in the determining, the frequency characteristics are obtained by applying a filter regarding the frequency characteristics to an input image.

23. The method according to claim 15, wherein information about a blur of the image is obtained.

24. The method according to claim 15, wherein the code is determined in the determining based on the information, the frequency characteristics, and an image capturing condition of the image capturing device.

25. The method according to claim 15, wherein in the determining, information about power in each specific band is used as the frequency characteristic, and the code is determined based on the information.

26. The method according to claim 25, wherein the information is information associated with deviation of power in said each specific band.

27. The method according to claim 25, wherein the information is information associated with attenuation of power in said each specific band.

28. The method according to claim 15, wherein the image capturing device is integrated in an image processing apparatus which executes the image processing method.

29. A non-transitory computer readable storage medium which stores a computer program to be executed in a processor of an image processing apparatus, the program comprising:
inputting an image obtained by capturing, by an image capturing device, a print product in which a digital watermark is embedded; and
based on information about a moving direction of the image capturing device with respect to the print product in the image capturing of the print product or frequency characteristics in a partial area of the input image, determining a code corresponding to the digital watermark embedded in the partial area,
wherein, in a case where the partial area contains a frequency component higher than a predetermined frequency, a code is determined in the determining, based on the frequency component, and
in a case where the partial area does not contain a frequency component higher than the predetermined frequency, a code is determined in the determining, based on the information.

* * * * *